(12) United States Patent
Sims, Jr.

(10) Patent No.: US 8,355,895 B2
(45) Date of Patent: *Jan. 15, 2013

(54) DRAWING VALIDATION TOOL

(75) Inventor: Dewey M. Sims, Jr., Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,962

(22) Filed: Dec. 22, 2011

(65) Prior Publication Data

US 2012/0166150 A1    Jun. 28, 2012

Related U.S. Application Data

(63) Continuation of application No. 11/536,075, filed on Sep. 28, 2006, now Pat. No. 8,087,004.

(51) Int. Cl.
*G06F 17/50* (2006.01)
*G06F 9/44* (2006.01)

(52) U.S. Cl. ............................................ 703/1; 717/126

(58) Field of Classification Search ....... 703/1; 717/126
See application file for complete search history.

(56) References Cited

U.S. PATENT DOCUMENTS

| | | | |
|---|---|---|---|
| 6,192,381 B1 | 2/2001 | Stiegemeier et al. | |
| 6,232,985 B1 | 5/2001 | Chase et al. | |
| 6,571,484 B2 | 6/2003 | Hastilow | |
| 6,725,184 B1 | 4/2004 | Gadh et al. | |
| 6,826,510 B2 | 11/2004 | Gong et al. | |
| 6,864,885 B2 | 3/2005 | Fujita | |
| 6,879,874 B2 | 4/2005 | Sinn | |
| 6,879,933 B2 | 4/2005 | Steffey et al. | |
| 2006/0106476 A1 | 5/2006 | Tornquist et al. | |
| 2007/0230770 A1* | 10/2007 | Kulkarni et al. | 382/149 |
| 2011/0286656 A1* | 11/2011 | Kulkarni et al. | 382/144 |

FOREIGN PATENT DOCUMENTS

| | | |
|---|---|---|
| GB | 2194367 | 3/1988 |
| JP | 08286955 | 11/1996 |

OTHER PUBLICATIONS

Kandikjan T et al, "A mechanism for validating dimensioning and tolerancing schemes in CAD systems" printed in No. 10, vol. 33, Computer Aided Design, published on Sep. 1, 2001 (pp. 721-737).

(Continued)

*Primary Examiner* — Dwin M Craig
*Assistant Examiner* — Andre Pierre Louis
(74) *Attorney, Agent, or Firm* — Michael Best & Friedrich LLP

(57) ABSTRACT

Methods and systems of validating the application of geometric dimensioning and tolerancing ("GD&T") in a drawing. In one embodiment, a method of validating the application of GD&T in a drawing includes creating a drawing having at least one drawing element. Next, a geometric dimensioning and tolerancing rule is applied to the at least one drawing element of the drawing. The legality of the applied geometric dimensioning and tolerancing rule is then verified with a software validation tool. Each illegal application of the geometric dimensioning and tolerancing rule is indicated with the software validation tool. Finally, a report is generated with the software validation tool, which contains each illegal application of the geometric dimensioning and tolerancing rule.

12 Claims, 17 Drawing Sheets

OTHER PUBLICATIONS

Koura M M et al, "Geometric dimension and tolerance modeling and validation system based on object oriented paradigm for 3D solid model", Proceedings of the ASME Computers and Information Engineering Division 20040101 of Nov. 13, 2004 (pp. 91-100).

European Search Report from the European Patent Office for Application No. 11156844.0 dated Dec. 19, 2011 (13 pages).

Excerpt from Japanese Office Action dated Apr. 21, 2011, Japanese Patent Application No. 2007-254569 (1 page).

European Patent Office Extended Search Report for Application No. 07400023.3 dated Aug. 5, 2010 (8 pages).

Excerpt from Japanese Office Action dated Jan. 10, 2012, Japanese Patent Application No. 2007-254569.

Office Action from the United States Patent and Trademark Office for U.S. Appl. No. 11/536,075 dated Feb. 24, 2011 (8 pages).

\* cited by examiner

Validation Tool Report

File Name: Component A
Number of GD&T Symbols Found: 13
Number of Datum Symbols Found: 11
Number of Errors Found: 5

55082
Illegal "Profile of Surface" GD&T Symbol
Drawing Sheet Name: Sheet123
Drawing View Name: View3
Location Name: Left-Top
Symbol ID Number: 55082
Specification: Unknown Profile Category; Planar, Coplanar, or True Profile not known
User Manual Section: 01-1C 71889
Illegal "Profile of Surface" GD&T Symbol
Drawing Sheet Name: Sheet123
Drawing View Name: View3
Location Name: Mid-Bottom
Symbol ID Number: 71889
Specification: Profile of a Surface must be applied to a feature only
User Manual Section: 01-1A

---

Total "Profile of Surface" GD&T Symbol Count: 2
Illegal "Profile of Surface" GD&T Symbol Specifications: 2

---

DATUM MISMATCH IDENTIFIED
(71889) Datum "Z" is missing in the drawing sheet

*Fig. 16*

DRAWING VALIDATION TOOL

CROSS REFERENCE TO RELATED APPLICATIONS

This application is a continuation of U.S. patent application Ser. No. 11/536,075, filed Sep. 28, 2006, now U.S. Pat. No. 8,087,004, the entire content of which is hereby incorporated by reference.

BACKGROUND

Embodiments of the present invention relate to a geometric dimension and tolerance checking and validation tool. More specifically, certain embodiments relate to a geometric dimension and tolerance checking and validation tool that identifies illegal geometric dimensioning and tolerancing in computer aided design ("CAD") drawings.

CAD drawings have become increasingly popular due to the expanded capabilities and sophisticated controls of CAD software applications. For example, CAD programs are commonly implemented to produce CAD drawings that are used by manufacturing companies to build and inspect manufactured products. Some CAD programs have the capability to apply or embed geometric dimensioning and tolerancing ("GD&T") to or in a CAD drawing. GD&T is an international language that includes a set of rules, which can be applied to elements of a CAD drawing. GD&T provides a user with functional dimensioning of the product or component illustrated in the CAD drawing.

SUMMARY

Although GD&T can be very useful, applying inaccurate or invalid GD&T can cause numerous problems. For example, if a drawing is used to manufacture a component (for example, a valve for an internal combustion engine), information derived from the GD&T could cause the component to be manufactured improperly (for example, the valve might be manufactured with improper dimensions, locations, orientations, etc). Thus, there is a need for a device or system whereby the validity and accuracy of the application of GD&T can be checked.

In one embodiment, the invention takes the form of a GD&T software validation tool that executes a variety of processes which, among other things, can be used to check and verify the application of GD&T in a drawing. For example, in some embodiments, the GD&T software validation tool identifies illegal tolerance modifiers contained in a GD&T feature control frame (as described, e.g., in process 150, step 160, below);

identifies tolerance and datum modifiers that are illegally used or improperly located within a profile feature control frame (as described, e.g., in process 150, steps 172 and 174, below);

verifies that the GD&T feature control frame is linked to a feature of size ("FOS") and not a feature (as described, e.g., in process 200, step 202 below);

verifies it is a FOS or feature (as described, e.g., in process 200, step 208 below);

verifies if an illegal datum modifier is specified for a feature (as described, e.g., in process 200, step 210 below);

verifies if an illegal datum modifier is specified for a FOS (as described, e.g., in process 200, step 212 below);

verifies if basic dimensions are used to establish the true position of the toleranced feature relative to the datums referenced (as described, e.g., in process 200, step 214 below);

verifies when datum references are used, that basic dimensions are used to relate the toleranced feature to the specified datums (as described, e.g., in process 150, step 168 below);

verifies that tolerances included in the flatness GD&T feature control frames are refinements that are relative to other GD&T feature control frames, or that are relative to location or size tolerances (as described, e.g., in process 250, step 260, below);

verifies that the methods used to attach the GD&T feature control frames to the features/features of size are correct (as described, e.g., in paragraph 64, below); and verifies that all of the datums that are utilized in the feature control frames of the drawing are actually applied to components within the drawing, and that all of the datums that are defined within the drawing are utilized in the GD&T control frames (as described, e.g., in paragraph 64, below).

In another embodiment, the invention takes the form of a method of validating dimensioning and tolerancing symbols, modifiers, and a feature control frame of a drawing. The manner in which the feature control frame is attached to a feature is also verified. Also, the GD&T magnitude and shape are verified for correctness along with the relationship between features/features of size that are linked by the GD&T feature control frame. The GD&T feature control frame, symbols, and modifiers collectively form a dimensioning tool that controls the shape, size, location, and orientation of the feature/feature of size and links the features/features of size to other features/features of size and to datums. The software validation tool ensures that all the GD&T dimensioning tools define all these functions and relationships correctly. The rules imbedded in the software validation tool help to determine whether or not the rules of GD&T (e.g., see FIGS. 4-14) are being correctly defined on the CAD drawing. Each GD&T rule error is numbered on the CAD drawing and the number is included in a report to help the operator locate the error on the drawing. The report describes why the symbol is illegal and provides a location in a user manual, which provides an example of the error along with examples on how to correct the error. The example drawings may include one or more relatively small drawings so as to fit on a single page of the user manual (e.g., see FIG. 17).

In another embodiment, the invention includes a method of validating applications of GD&T in a drawing. This method includes creating a computer aided design drawing having at least one drawing element. One or more GD&T rules are applied to the at least one drawing element of the drawing. The legality of the GD&T rules are then verified with a software validation tool. Generally, verifying the legality of a GD&T rule includes verifying that the application of the GD&T rule satisfies a certain set of restrictions (described below). Each illegal application of the GD&T rule is also indicated with the software validation tool.

In another embodiment, a method of validating applications of GD&T in a drawing includes creating a drawing having at least one drawing element. At least one GD&T rule is applied to the at least one drawing element of the drawing. The legality of the at least one GD&T rule is then verified with a software validation tool. Each illegal application of the GD&T rules is also indicated with the software validation tool. Finally, a report is generated with the software validation tool, which contains each illegal application of the GD&T rules.

In another embodiment, a drawing validation tool comprises a process module, an identification module, and a report module. The process module includes at least one process for validating the application of one or more GD&T rules in a CAD drawing. The identification module identifies an illegal application of one or more GD&T rules that are applied in the CAD drawing. The application is illegal if it does not follow the rules, for example, defined in FIGS. 4-14. The report module produces a report that contains information regarding the illegally applied GD&T rules on the CAD drawing.

Other aspects of the invention will become apparent by consideration of the detailed description and accompanying drawings.

BRIEF DESCRIPTION OF THE DRAWINGS

FIG. 16 illustrates an exemplary error report.

DETAILED DESCRIPTION

Figure 1:
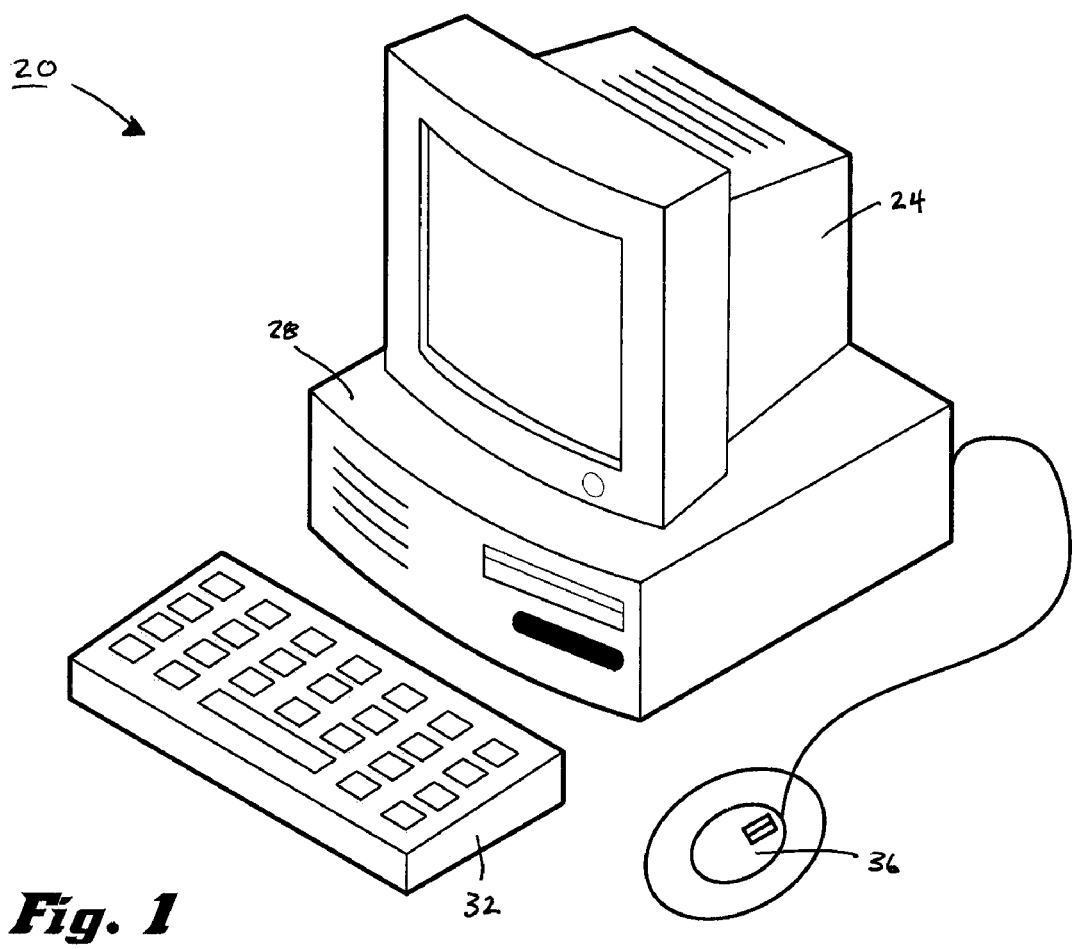
FIG. 1 illustrates an exemplary computer system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The term "illegal" (and variants thereof) is used herein to describe certain aspects of embodiments of the invention. The term "illegal" is used to broadly describe elements and/or actions that are not allowed, or that lead to invalid results, as should be apparent to one of ordinary skill in the art. The use is not a special one, but one that is consistent with the general definition of the term. For example, as defined by the Microsoft Computer Dictionary, 4$^{th}$ Edition, an illegal character in a word processing program would be one that the program cannot recognize; and an illegal operation might be impossible for a program or system to carry out because of built-in constraints. Thus, the term should be interpreted as it would be by one of ordinary skill in the art.

In addition, before describing embodiments of the invention a brief review of CAD software applications that include GD&T functionality is provided. Nonetheless, it is assumed that the reader is familiar with GD&T specifications.

Some CAD software applications (e.g., Unigraphics, CATIA, etc.) allow a user to apply GD&T to the components that are modeled in CAD drawings. For example, GD&T rules, which may be indicated in the drawing using one or more GD&T symbols, are applied to the components being modeled in the CAD drawings. The GD&T rules are used to define the physical dimensions (and tolerances) of the components in the drawings. As such, a user can create an accurate component by following the GD&T rules applied in the drawings. Additionally, a component that has been produced can be inspected (e.g., verified to determine whether the component has been produced according to the specification set forth in the drawing model) by comparing the produced component to the drawing model. Illegally applied GD&T rules on a CAD drawing may cause manufacturing problems, assembly problems, inspection problems and loss of function.

In general, drawings that include GD&T also include other standard symbols and information such as dimensional values, which are often displayed in a standardized manner. For example, as should be recognized by those skilled in the art, basic dimensions are numerical values that represent a theoretical exact size, true profile, orientation, or location of a feature. Generally, basic dimensions are specified by enclosing a single numerical value in a box. Alternatively, dimensions with tolerances provide a range of acceptable dimension values. A datum is a theoretically exact point, axis, or plane from which the location or geometric characteristics of features of a component are established or related. A datum feature can be used to identify the same feature in multiple locations of a drawing.

FIG. 1 illustrates an exemplary computer system 20 that can be used, in some embodiments, to create a CAD drawing with a CAD software application and validate drawings and GD&T in the drawing (described below). The exemplary computer 20 generally includes components such as a monitor 24, a housing 28, a keyboard 32, and a mouse 36. It should be apparent to those skilled in the art that the hardware housing 28 may contain, for example, hardware components such as one or more processors, random access memory, storage devices (e.g., hard drives, CD-ROM disk drives, etc.), and the like. Additionally, software applications executed by the hardware can be used to produce CAD drawing images on the monitor 24. The images can be manipulated by user input devices such as the keyboard 32 and the mouse 36.

Figure 2:
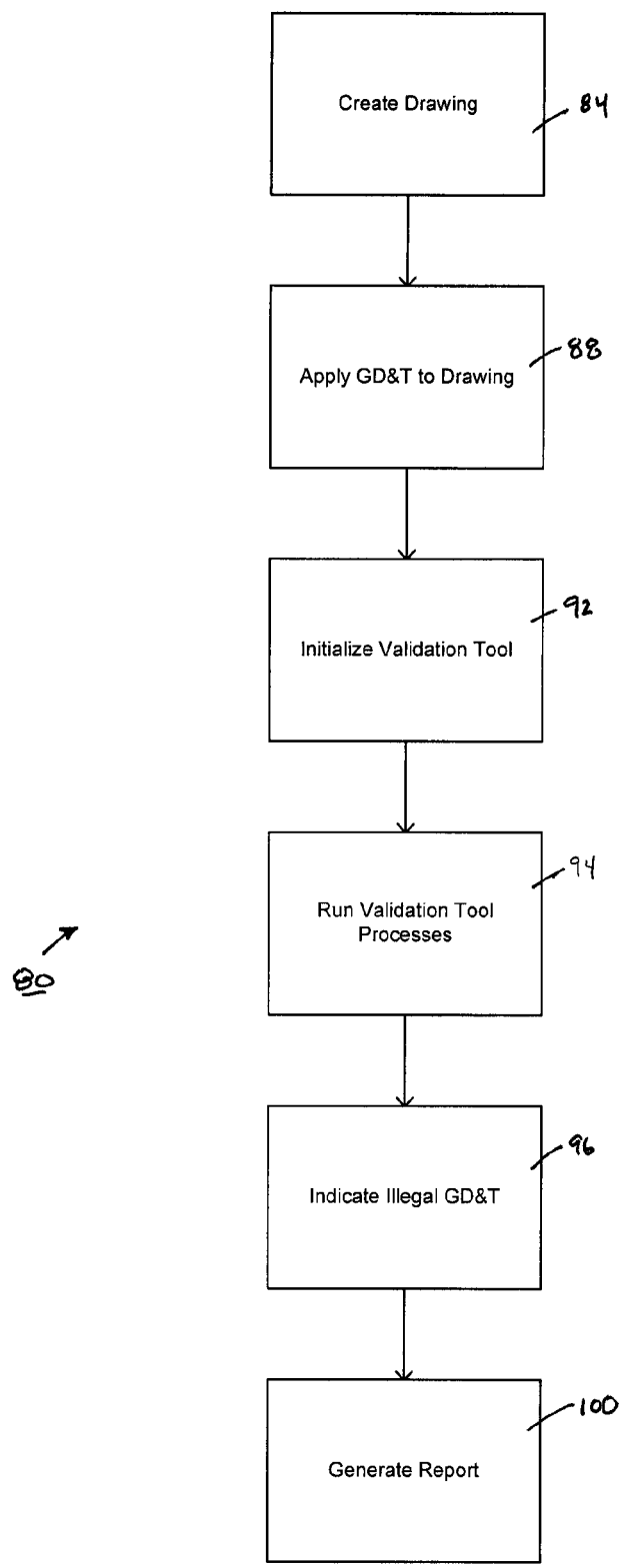
FIG. 2 illustrates an exemplary process which can be used to identify an illegal GD&T symbol.

FIG. 2 illustrates an exemplary process 80 that identifies GD&T that has been applied to a CAD drawing incorrectly or illegally. For example, the process 80 can be used to identify GD&T that is not applied to drawing components of a CAD drawing according to a certain set of rules or conditions. As described below, there are numerous reasons that GD&T rules applied in a drawing are identified as being illegal. In some embodiments, a GD&T rule is identified as illegal if the GD&T rule is applied to a drawing component in an impossible or nonsensical manner. In other embodiments, the application of a GD&T rule is identified as illegal if the GD&T rule is technically applied correctly, but is not applied according to common or "good practice" standards.

The process 80 begins by creating a CAD drawing (step 84). The CAD drawing can be created, for example, using a CAD software application and the computer 20 shown in FIG. 1. After and/or while the CAD drawing is being created, GD&T is applied to components of the CAD drawing (step 88). In some embodiments, a modeled component can include multiple drawing views that correspond to the same component (e.g., a top view, a front view, an isometric view, etc.). As such, GD&T that is applied to one drawing view must also be logical in other views for a given component.

After completing the CAD drawing and applying GD&T (steps 84 and 88, respectively), a GD&T validation tool is initialized (step 92). In some embodiments, the GD&T validation tool is a knowledge-based software tool that is added onto (or integrated into) an independent CAD software platform (e.g., Unigraphics). As such, it should be appreciated that the GD&T validation tool is capable of being applied to many different CAD software platforms, and is not limited to any one platform. In some embodiments, the GD&T validation tool is initialized by a user while operating the CAD software application. For example, a user can choose to initialize the GD&T validation tool by selecting a GD&T validation tool icon or other user-selectable item (e.g., an item in a GD&T validation tool pull-down menu) while constructing a CAD drawing. In other embodiments, the GD&T validation tool is automatically initialized, for example, prior to saving the CAD drawing to disk. Other ways of initializing the GD&T validation tool are also possible. For example, in alternative embodiments, the GD&T validation tool may be a software application that is separate from the CAD software. In such embodiments, the GD&T validation tool may validate a previously saved CAD drawing by initializing the GD&T validation tool and selecting a saved CAD drawing.

After initializing the GD&T validation tool, the validation tool completes a plurality of validation processes (see, for example, FIGS. 4-14) (step 94). The validation processes are used to indicate GD&T that are improperly or illegally applied (described below). In some embodiments, a user selects which validation processes that the validation tool completes. For example, a user can select a subset of the processes shown in FIGS. 4-14 for a particular drawing. As such, the validation tool need not complete all of the processes each time the validation tool is run. Additionally, the validation tool may include alternative processes (or steps within the processes) that are not specifically described herein with respect to FIGS. 4-14. For example, in some embodiments only a subset of the steps within each process is completed when the validation tool is run.

Upon completion of the GD&T validation tool processes (step 94), illegally and/or invalidly applied GD&T is identified in the CAD drawing (step 96). As described in greater detail with respect to FIG. 15, illegally applied GD&T can be identified in a variety of manners. In addition to indicating the illegally applied GD&T in the CAD drawing, a GD&T validation tool report is created (step 100). The GD&T validation tool report includes, for example, information regarding each illegal application of GD&T.

Figure 3:
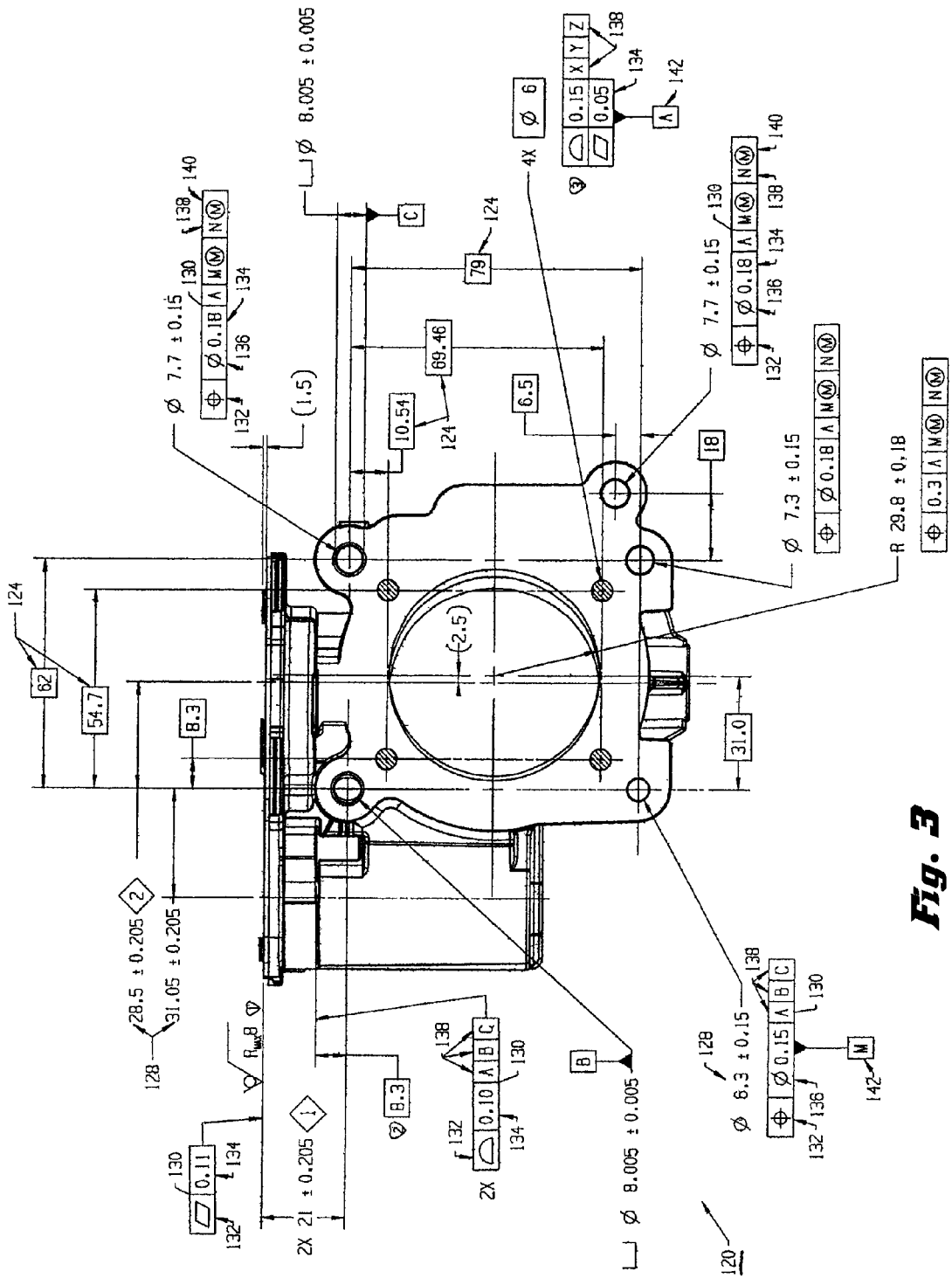
FIG. 3 illustrates an exemplary CAD drawing having a plurality of GD&T symbols.

FIG. 3 illustrates an exemplary CAD drawing 120. The drawing 120 can be created, for example, during step 84 of the process 80 (FIG. 2). The drawing 120 generally includes basic dimensions 124, as well as dimensions with tolerances 128. The dimensions included in the CAD drawing 120 are not necessarily representative of an actual component, and are included for illustrative purposes only. The drawing 120 also includes multiple feature control frames ("control frames") 130, which are divided into compartments containing a characteristic symbol 132 (e.g., straightness, flatness, circularity, profile of line, profile of surface, runout, position, etc.) followed by a tolerance value 134. In some embodiments, the tolerance value 134 is also preceded by a diameter symbol 136 and/or followed by a datum reference 138 and/or tolerance or datum modifiers 140. Additionally, in some embodiments, control frames 130 are associated with datum features 142. The completed drawing 120 can be checked for invalid or illegal applications of GD&T using one or more processes (see FIGS. 4-14). In other embodiments, the drawing 120 may include more or fewer dimensions 124, dimensions with tolerances 128, feature control frames 130, datum features 142, etc.

Figure 4:
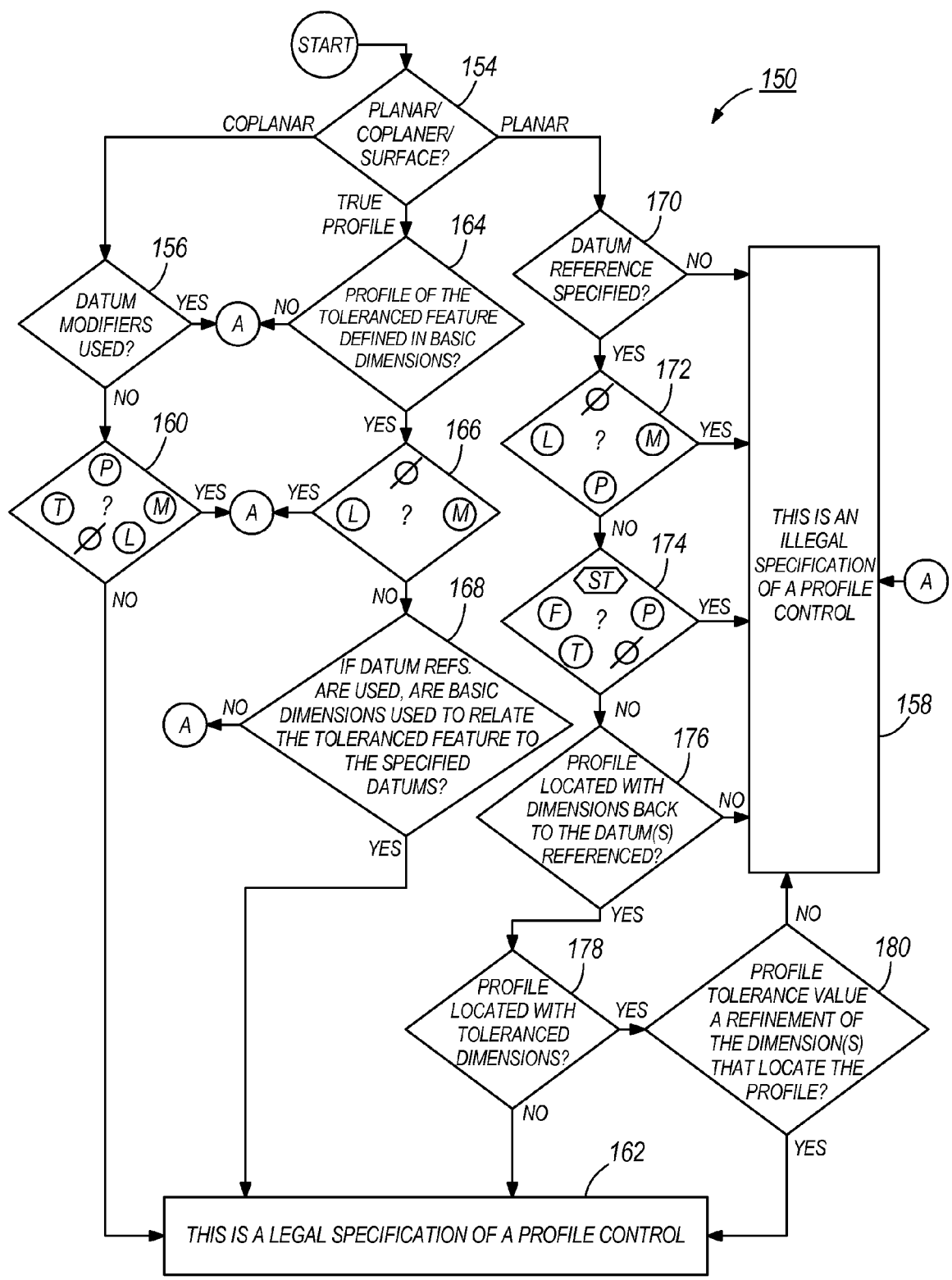
FIG. 4 illustrates an exemplary process that can be used to verify a profile control.

FIG. 4 is an exemplary process 150 that determines whether a GD&T profile of surface control is correctly applied in a CAD drawing. In some embodiments, the process 150 is carried out by the validation tool during step 94 of the process 80 (FIG. 2). The process begins by determining whether the surface that the profile of surface control is applied to (e.g., as indicated by a profile of surface symbol on the drawing) is coplanar, a true profile, or planar (step 154). A planar surface is a single, continuous, and flat surface. A coplanar surface is two or more surfaces that are on the same plane, or a phantom line that joins multiple surfaces on the same plane. A true profile surface is a circular or multifaceted surface that is defined with basic dimensions (described above).

If the profile of surface is applied to a coplanar surface, the next step is to check if any datum modifiers are associated with the specification of the profile of surface (step 156). If datum modifiers are used, the validation tool identifies an illegal specification of a profile control (step 158). In some embodiments, if an illegal control is identified, an illegal control identification tag is applied to the profile of surface symbol on the drawing, and a report is generated that includes details regarding the illegal control (as described in greater detail with respect to FIGS. 15 and 16). Next, the validation tool checks if certain tolerance modifiers are associated with the specification of the profile of surface (step 160). In some embodiments, illegal tolerance modifiers include diameter, maximum material condition, least material condition, projected tolerance zone, and tangential. If the tolerance modifiers are used, an illegal specification of a profile control is identified (step 158). If the tolerance modifiers are not used, the validation tool identifies a legal specification of a profile control (step 162) and the process 150 ends.

If the profile of surface symbol is applied to a true profile, the validation tool verifies that the profile of the toleranced feature (e.g., the surface) is defined in basic dimensions (step 164) (i.e., the toleranced feature is not defined in toleranced dimensions). If basic dimensions are not used to define the profile of the toleranced feature, the validation tool identifies an illegal specification of a profile control (step 158). Next, the validation tool searches for a certain set of tolerance modifiers. In some embodiments, the allowed tolerance modifiers for a true profile are different than the allowed tolerance modifiers for a coplanar surface. For example, if the toleranced feature is a true profile, illegal modifiers include least material condition, diameter, and maximum material condition (step 166). If such modifiers are used, the validation tool identifies an illegal specification of a profile control (step 158). If the modifiers are not used, datum references are verified. More specifically, datum references are inspected to verify that basic dimensions are used to relate the toleranced feature to the specified datum (step 168). If basic dimensions are used to relate the toleranced feature to the specified datum, a legal specification of a profile control is identified (step 162) and the process 150 ends. If not, an illegal specification of a profile control is identified (step 158).

If the profile of surface is applied to a planar surface, the validation tool searches for datum references (step 170). If no datum references are specified, the profile of surface symbol is identified as being an illegal specification of a profile control (step 158). Next, the validation tool verifies that a certain illegal set of tolerance modifiers are not specified (step 172). In some embodiments, the validation tool checks for diameter, least material condition, maximum material condition, and projected tolerance zone modifiers. In other embodiments, a different set of modifiers may be illegal. If illegal modifiers are included, the validation tool identifies an illegal specification of a profile control (step 158). Next the validation tool checks a similar set of datum modifiers (step 174). If statistical tolerance, free state, projected tolerance zone, tangential, or diameter modifiers are included in the profile of surface control frame, the profile control is identified as being illegal (step 158). If the illegal datum modifiers are not included, the validation tool verifies that the profile of surface is dimensioned with respect to the specified datum references (if included) using basic dimensions (step 176). The validation tool also checks if the profile is located with toleranced dimensions (step 178). If the profile is not located with toleranced dimensions, the profile control is legal (step 162).

If, however, the planar profile is located with toleranced dimensions, the validation tool checks if the tolerance value is a refinement of other geometric tolerances that control the profile of the planar surface (step 180). For example, in some embodiments, other geometric tolerances may be applied to the planar surface (i.e., the planar surface that the profile of surface symbol is applied to). In such embodiments, the profile control should be a refinement over the other geometric tolerance value, and the refinement should be seventy (70) percent or less than the other geometric tolerance. As such, if the profile tolerance is not a refinement of another geometric tolerance, the validation tool identifies an illegal profile of surface control (step 158). In other embodiments, the refinement requirement (step 180) is not included in the process 150.

In some embodiments, the process 150 is used to determine whether a GD&T profile of line control is correctly applied. However, in the interest of brevity, the process 150 is only described herein with respect to the profile of surface control symbol. One of ordinary skill in the art should realize that the rules described with respect to validating a profile of surface control symbol can be similarly applied to a profile of line control symbol.

Figure 5:
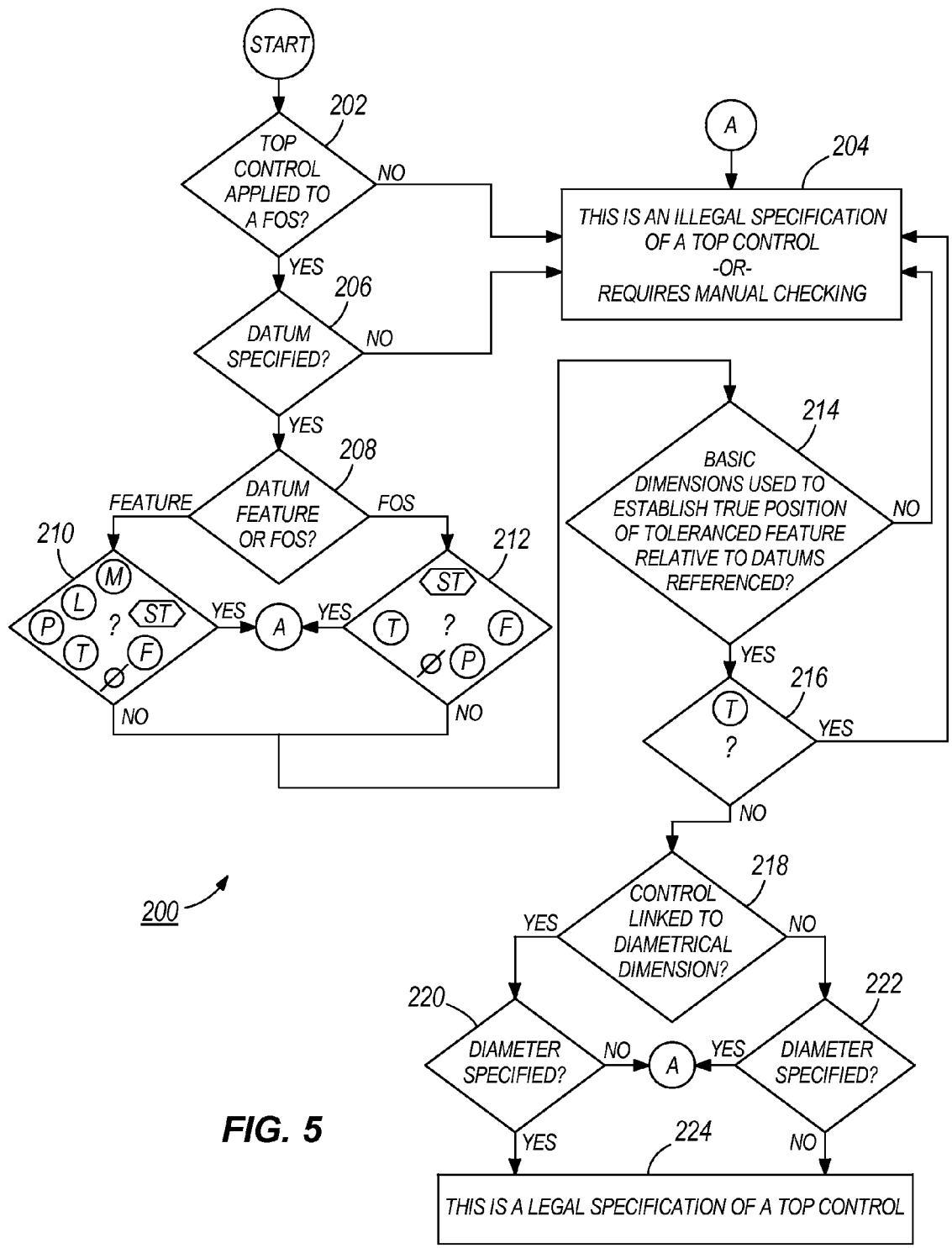
FIG. 5 illustrates an exemplary process that can be used to verify a TOP control.

FIG. 5 is an exemplary process 200 that determines whether a GD&T tolerance of position control is correctly applied in a CAD drawing. In some embodiments, the process 200 is carried out by the validation tool during step 94 of the process 80 (FIG. 2). The process begins by determining if the TOP is applied to a feature or a feature of size ("FOS") (step 202). A feature is a general term that is applied to a physical portion of a component, such as a surface, a pin, a tab, a hole, etc. Additionally, an FOS generally refers to a cylindrical or spherical surface, or a set of two opposed elements or opposed parallel surfaces, associated with a size dimension. If the TOP is not applied to an FOS, the specification of the TOP control is illegal (step 204).

If the TOP is applied to an FOS, the validation tool checks if datum references are specified (step 206). In some embodiments, a datum plane must be specified in a TOP feature control frame, and the datum plane must appear in the drawing. In other embodiments, datum references for co-axial, non-opposed diameters need not be specified in a feature control frame. If proper datum references are not specified, the specification of a TOP control is identified as being illegal (step 204). If datum references are properly specified, the validation tool checks if the datum references refer to a feature or an FOS (described above) (step 208). In some embodiments, allowable datum modifiers differ based on whether the modifier is applied to a feature or an FOS. For example, if the datum reference(s) refer(s) to a feature, there should not be any modifiers specified as datum modifiers (step 210). If datum modifiers are included for datum that refer to a feature, the specification of the TOP control is identified as being illegal (step 204). Similarly, only allowed datum modifiers, such as maximum material condition and least material condition modifiers, can be used for datum references that refer to an FOS (step 212). If illegal datum modifiers are used for datum that refer to an FOS (e.g., a diameter modifier, a projected tolerance zone modifier, a free state modifier, etc.), the specification of the TOP control is identified as being illegal (step 204).

Next, the validation tool verifies that basic dimensions are used to establish the true position of the toleranced feature relative to the datum references (step 214). If basic dimensions are not used, the specification of the TOP control is identified as being illegal (step 204). Next, the validation tool verifies that the tangential modifier is not used (step 216). If the tangential modifier is used, the specification of the TOP control is identified as being illegal (step 204). Next, the validation tool checks if the TOP control is linked to a diametrical dimension (step 218). If the control is linked to a diametrical dimension, the diameter must be specified (step 220) or the TOP control is illegal (step 204). If the control is not linked to a diametrical dimension, no diameter should be specified (step 222), or the TOP control is illegal (step 204). As such, the specification is identified as being legal if the control is linked to a diametrical dimension and the diameter is specified, or the control is not linked to a diametrical dimension and no diameter is specified (step 224).

Figure 6:
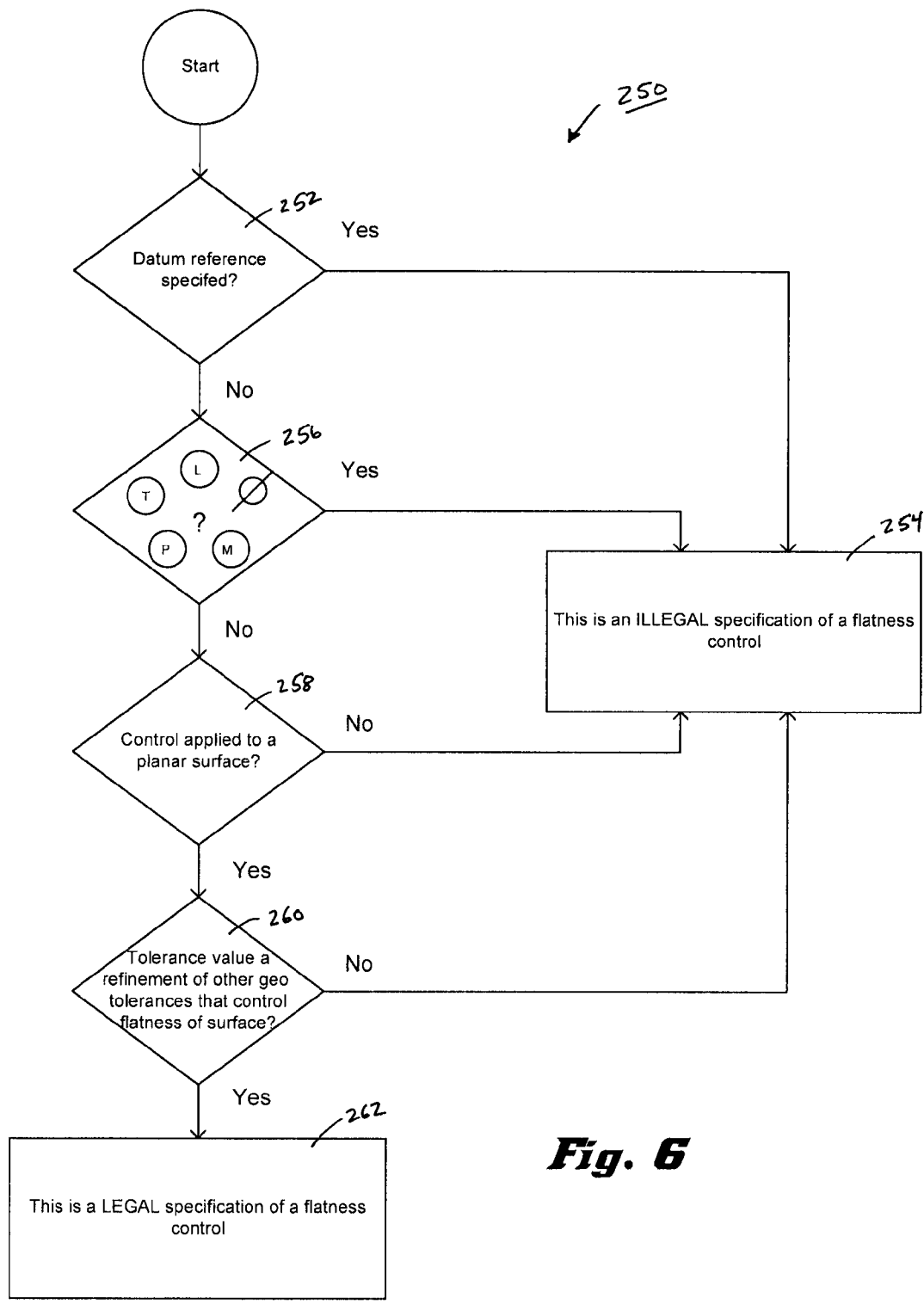
FIG. 6 illustrates an exemplary process that can be used to verify a flatness control.

FIG. 6 illustrates an exemplary process 250 that determines whether a GD&T flatness control is correctly applied in a CAD drawing. In some embodiments, the process 250 is carried out by the validation tool during step 94 of the process 80 (FIG. 2). The process begins by determining if any datum references are specified (step 252). In some embodiments, no datum references are allowed when specifying a flatness control. As such, if datum references are included in the control frame, the specification of the flatness control is illegal (step 254). Next, the validation tool checks for certain allowed tolerance modifiers (step 256). In some embodiments, the only tolerance modifiers that are allowed are the free state modifier and the statistical tolerance modifier. If other tolerance modifiers are included, the specification of the flatness control is identified as being illegal (step 254). The validation tool continues with the process 250 by checking if the flatness control is applied to a planar surface (step 258). A planar surface can refer to any surface that is defined by a plane. If the flatness control is not applied to a planar surface, the validation tool identifies an illegal specification of flatness control (step 260).

Alternatively, if the flatness control is applied to a planar surface, the validation tool checks if the tolerance value is a refinement of other geometric tolerances that control the flatness of the surface (i.e., the surface to which the flatness control symbol is applied) (step 260). In some embodiments, as described above, the flatness control must be a refinement over another geometric tolerance value (if included). For example, if a surface is located with a tolerance range of 1.0 applied to it, a flatness control value that is applied to the same surface must be less than 0.7. If the tolerance value is not a refinement, it is identified as being an illegal specification of a flatness control (step 254). If, however, the tolerance is a refinement and is less than seventy (70) percent of the other geometric tolerance, the specification of the flatness control is identified as being legal (step 262).

Figure 7:
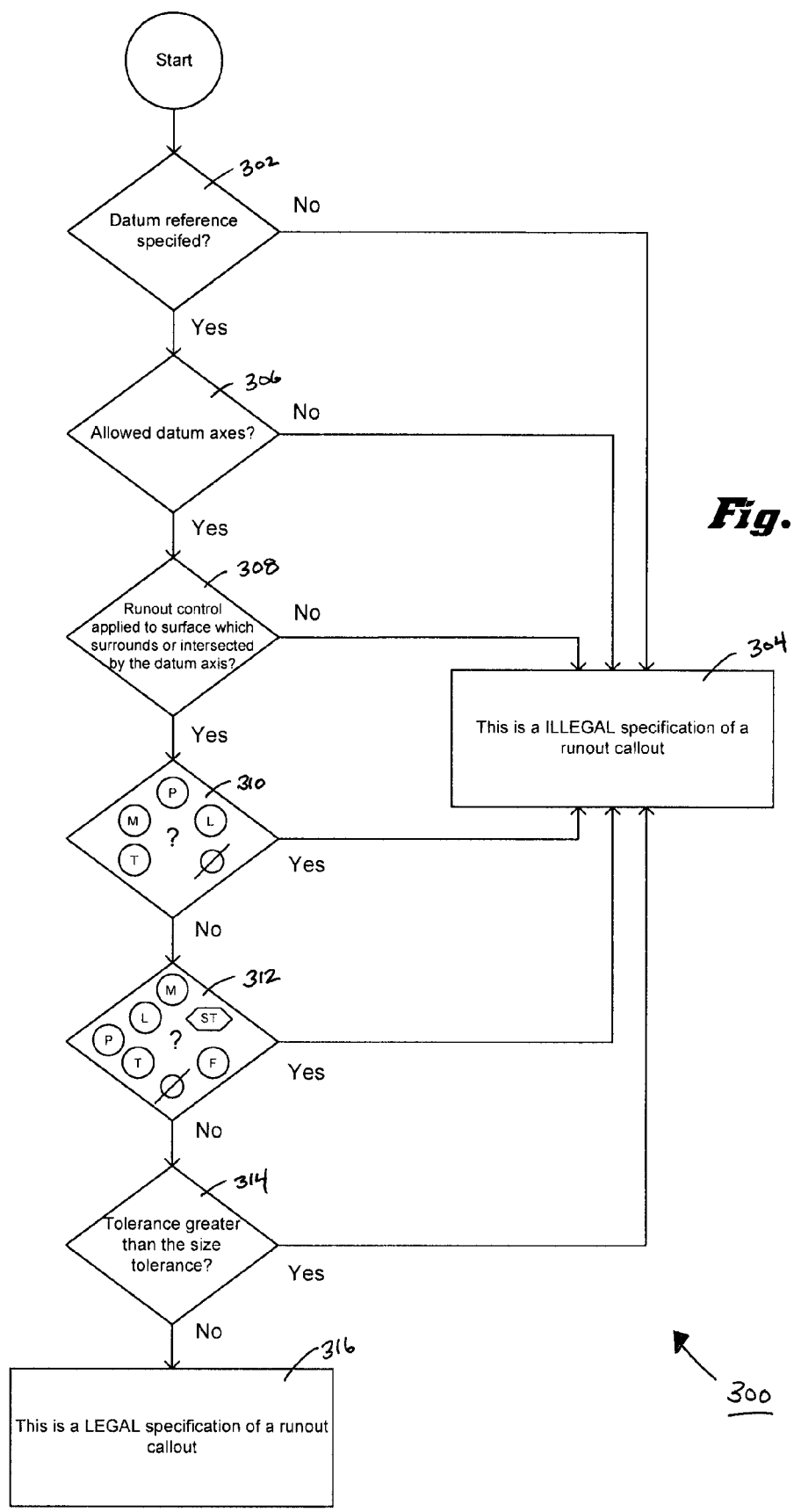
FIG. 7 illustrates an exemplary process that can be used to verify a runout callout.

FIG. 7 illustrates an exemplary process 300 that determines whether a GD&T runout control is correctly applied in a CAD drawing. In some embodiments, the process 300 identifies the legality of both a circular runout control as well as a total runout control. The process 300 begins by determining if any datum references are specified (step 302). In some embodiments, datum references must be specified for a runout control. As such, if datum references are not included in the control frame, the specification of the runout control is identified as being illegal (step 304). Next, the validation tool verifies that the one or more datums specify one of the three allowed datum axes (i.e., centerline of the datum cylinder as established by the extremities or contacting points of the actual cylindrical component) (step 306). Utilizing datum axes that are specified in accordance with the rules set forth below can improve repeatability of measurements.

In an embodiment, the first allowed datum axis is a datum axis associated with a component that is of a sufficient length. For example, a datum that is inline with a dimension line of the component means that the datum is applied to a feature of size. Additionally, the specified datum represents the datum axis of the diameter of the specified cylindrical component. As such, the length of the component (along the datum axis) should be approximately two times the diameter of the cylindrical component. In other embodiments, the length to diameter ratio may be different (e.g., 2.5 times, 3 times, etc.). The second allowed datum axis is a datum axis associated with two diameters of cylindrical components that are spaced apart, where the space between the two diameters is three times the larger diameter (of the two diameters). The third allowed diameter axis is a datum axis that is defined by two datums, where the first specified datum (i.e., the primary datum) is applied to a feature and the second specified datum (i.e., the secondary datum) is applied to an FOS. If the allowed types of datum axes are not specified, the validation tool identifies an illegal specification of runout control (step 304).

If the datum specifies an allowed datum axis, the validation tool verifies that the runout control is applied to a surface which surrounds or is intersected by the datum axis (step 308). If the runout control is applied to a valid surface, the validation tool checks for tolerance modifiers included in the control frame (step 310). In some embodiments, only free state and statistical tolerance modifiers are allowed to modify the runout control. If the runout control is applied to an invalid surface, or other tolerance modifiers are included, the validation tool identifies an illegal specification of a runout callout (step 304). The next step of the process is to verify that no datum modifiers are included (step 312). In some embodiments, no datum modifiers are allowed. As such, if any datum modifiers are included in the control frame, the validation tool identifies an illegal specification of a runout callout (step 304). Next, the validation tool verifies that the tolerance value that is specified in the control frame is less than the size tolerance (step 314). For example, if a size tolerance for a given component is (24.6-24.2), the tolerance value must be less than the size tolerance dimension (i.e., less than 0.4). If the tolerance value is less than the size tolerance, the validation tool identifies a legally specified runout callout (step 316). If the tolerance value is greater than the size tolerance, the validation tool identifies an illegal specification of a runout callout (step 304).

Figure 8:
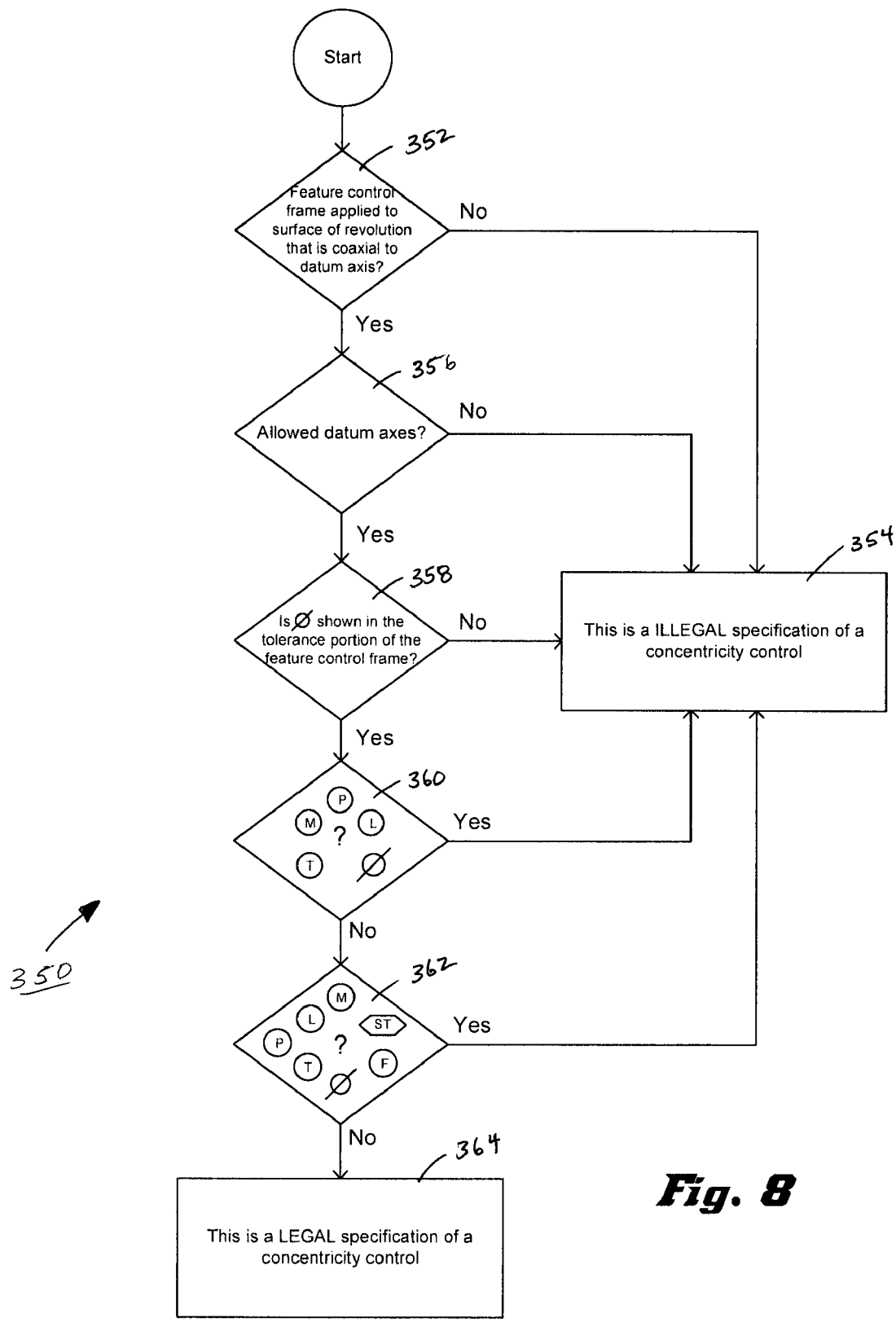
FIG. 8 illustrates an exemplary process that can be used to verify a concentricity control.

FIG. 8 illustrates an exemplary process 350 that determines whether a GD&T concentricity control is correctly applied in a CAD drawing. The process 350 begins by determining if the concentricity control frame is applied to a surface of revolution that is coaxial to a datum axis (step 352). If the concentricity control is not applied to such a surface, the validation tool indicates an illegal specification of a concentricity control (step 354). Next, the validation tool checks if the one or more datum referenced specify one of the three types of datum axes (as described with respect to FIG. 7) (step 356). Next, the validation tool checks if there is a diameter symbol in the tolerance portion of the feature control frame (step 358). In some embodiments, the diameter symbol must appear in the tolerance portion of the control frame or the specification of a concentricity control is illegal. Next, the validation tool checks for tolerance modifiers (step 360). Legal tolerance modifiers include the diameter modifier, the free state modifier, and the statistical tolerance modifier. If other modifiers are included in the control frame, the validation tool identifies an illegal specification of a concentricity control (step 354). Similarly, at least in some embodiments, the validation tool checks for datum modifiers in the control frame (step 362), and if any datum modifiers are included, the validation tool indicates an illegal specification of a concentricity control (step 354). If no datum modifiers are included, the validation tool indicates that the specification of the concentricity control is legal (step 364).

Figure 9:
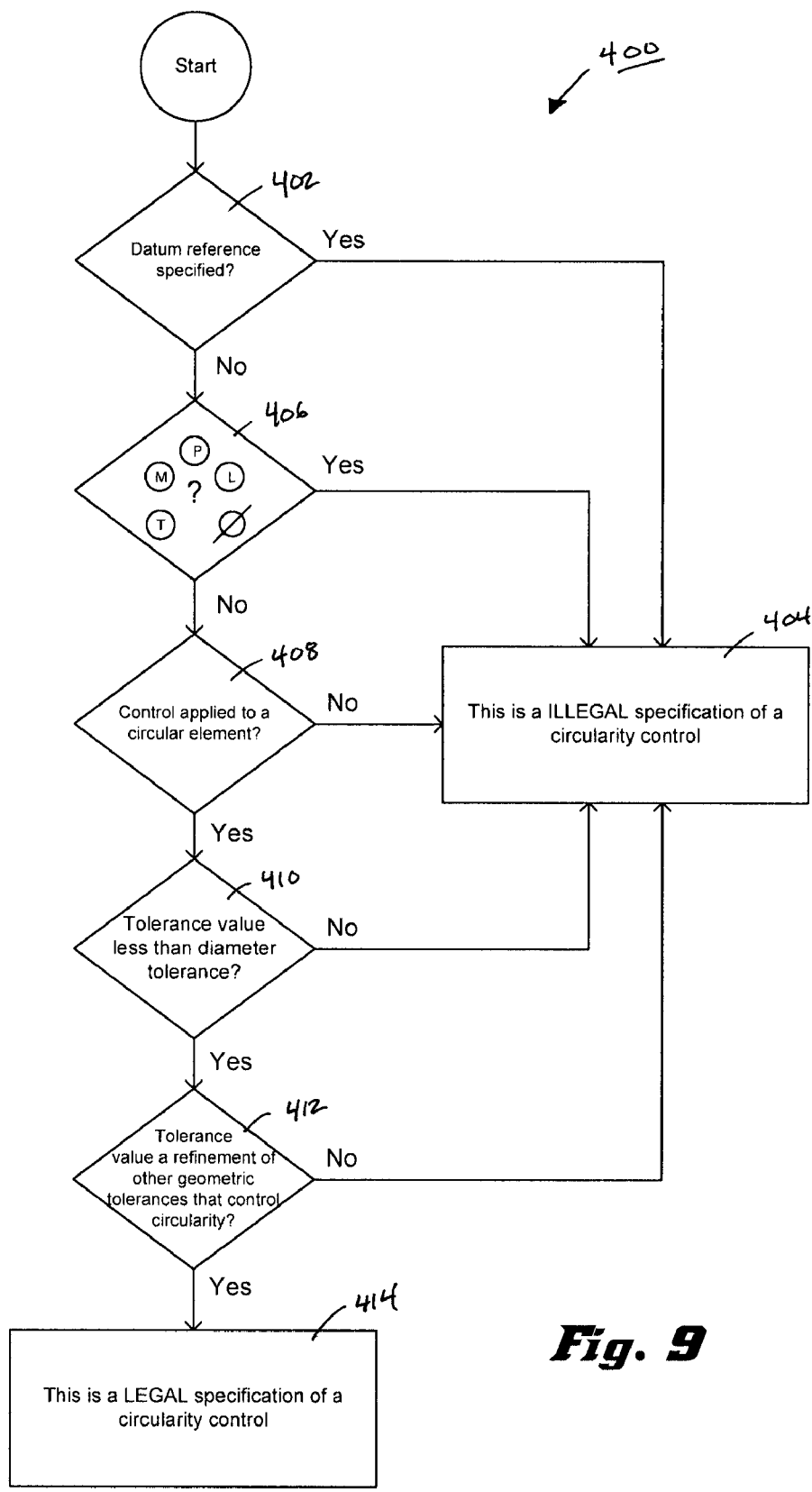
FIG. 9 illustrates an exemplary process that can be used to verify a circularity control.

FIG. 9 illustrates an exemplary process 400 that determines whether a GD&T circularity control is correctly applied in a CAD drawing. In some embodiments, the process 400 is carried out by the validation tool during step 94 of the process 80 (FIG. 2). The process 400 begins by determining if any datum references are specified (step 402). In some embodiments, no datum references are allowed when specifying a circularity control. As such, if datum references are included in the circularity control frame, the specification of the circularity control is identified as being illegal (step 404). Next, the validation tool checks for certain allowed tolerance modifiers (step 406). In some embodiments, the only tolerance modifiers that are allowed are the free state modifier and the statistical tolerance modifier. If other tolerance modifiers are included, the specification of the flatness control is identified as being illegal (step 404). The validation tool continues with the process 400 by checking if the circularity control is applied to a circular element (step 408) (i.e., the feature on which the circularity symbol is applied is circular in shape). If the circularity control is not applied to a circular element, the specification of the circularity control is identified as being illegal (step 404).

Next, the validation tool verifies that the tolerance value is less than the diameter tolerance associated with the toleranced element (step 410). For example, the circularity tolerance value for a circle having a diameter tolerance of (12.0-12.8) should be less than 0.8. If this tolerance relationship is not maintained (e.g., the circularity tolerance is larger than the diameter tolerance) the validation tool indicates an illegal specification of a circularity control. Additionally, the validation tool may also check if the circularity tolerance value is a refinement of other geometric tolerances that control the circularity of the toleranced element (step 412). In some embodiments, that circularity control refinement must be less than 70% of the geometric tolerance value. In other embodiments, an alternative refinement standard may be used (e.g., less than 60%) If a valid circularity control refinement is used, the validation tool identifies a legal specification of circularity control (step 414).

Figure 10:
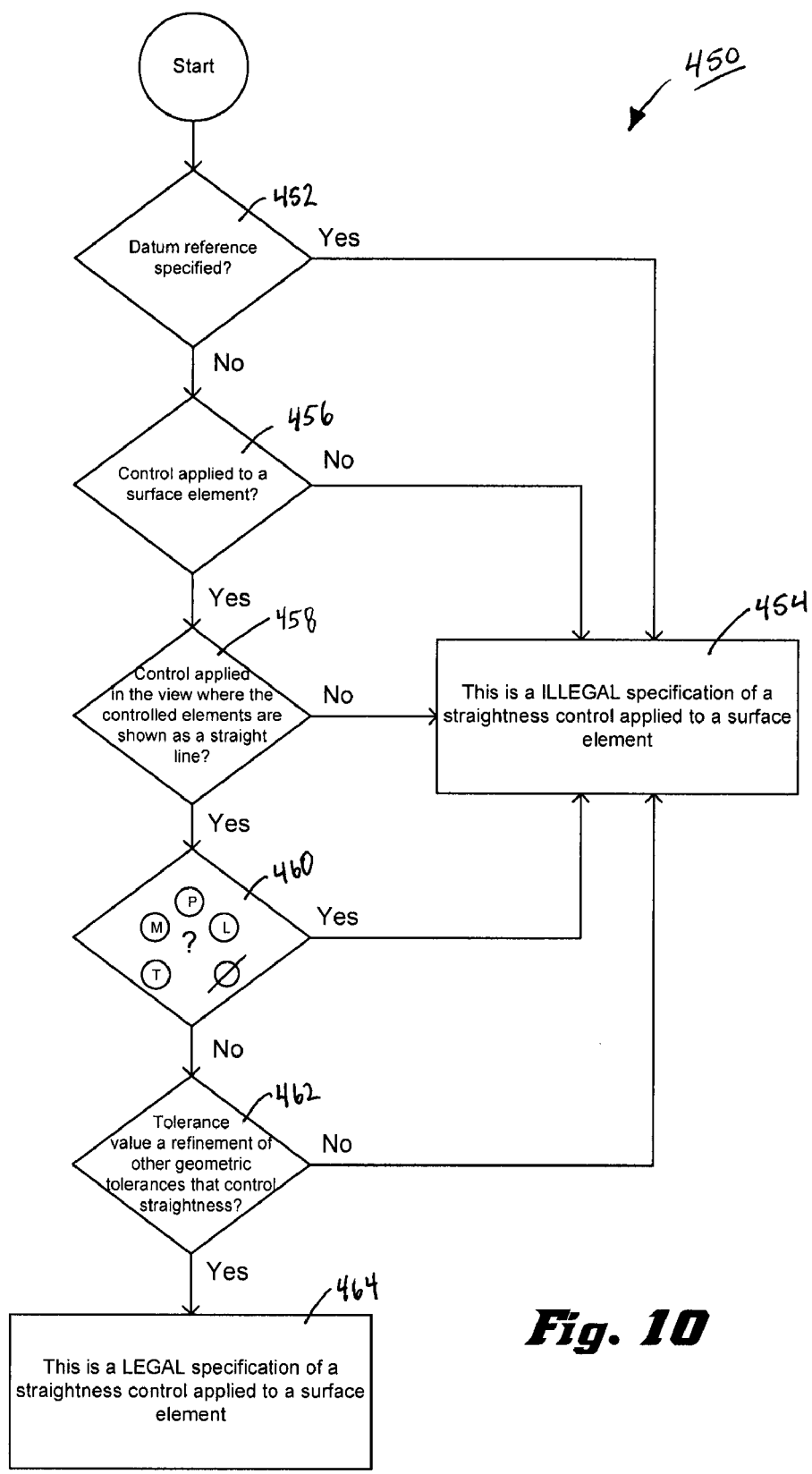
FIG. 10 illustrates an exemplary process that can be used to verify a straightness control applied to a surface element.

FIG. 10 illustrates an exemplary process 450 that determines whether a GD&T straightness control that is applied to a surface element is correctly applied in a CAD drawing. As with other processes discussed above, the process 450 can be carried out by the validation software tool during step 94 of the process 80 (FIG. 2). The process 450 begins by determining if any datum references are specified (step 452). In some embodiments, no datum references are allowed when specifying a straightness control to a surface element. As such, if datum references are included in the straightness control frame, the specification of the straightness control is identified as illegal (step 454). If no datum references are included, the validation tool verifies that the straightness control is actually applied to a surface element (step 456). In some embodiments, due to limited drafting views (e.g., limited viewing angles on the screen of the computer 20), the GD&T control frame is attached to an edge of an element instead of a surface of an element. As such, the validation tool must verify that the straightness control is applied to an edge that belongs to a surface. If the straightness control is not applied to a surface element, the specification of the straightness control is identified as illegal (step 454).

Next, the validation tool verifies that the straightness control is applied in a drafting view where the controlled elements (i.e., the elements to which the straightness control is applied) are shown as a straight line (step 458). If the controlled element is not shown as a generally straight line, the validation tool indicates an illegal specification of a straightness control (step 454). The validation tool also checks the control frame for tolerance modifiers (step 460). In some embodiments, the validation tool only allows free state and statistical tolerance modifiers in the control frame. As such, if other tolerance modifiers are included, the validation tool indicates an illegal specification of a straightness control (step 454). Additionally, the validation tool verifies that the straightness tolerance value is a refinement of another geometric tolerance that controls the straightness of the toleranced element (as described above) (step 462). If a valid straightness control refinement is used (e.g., a refinement less than 70% of the other geometric tolerance), the validation tool indicates that the straightness control specification is legal (step 464).

Figure 11:
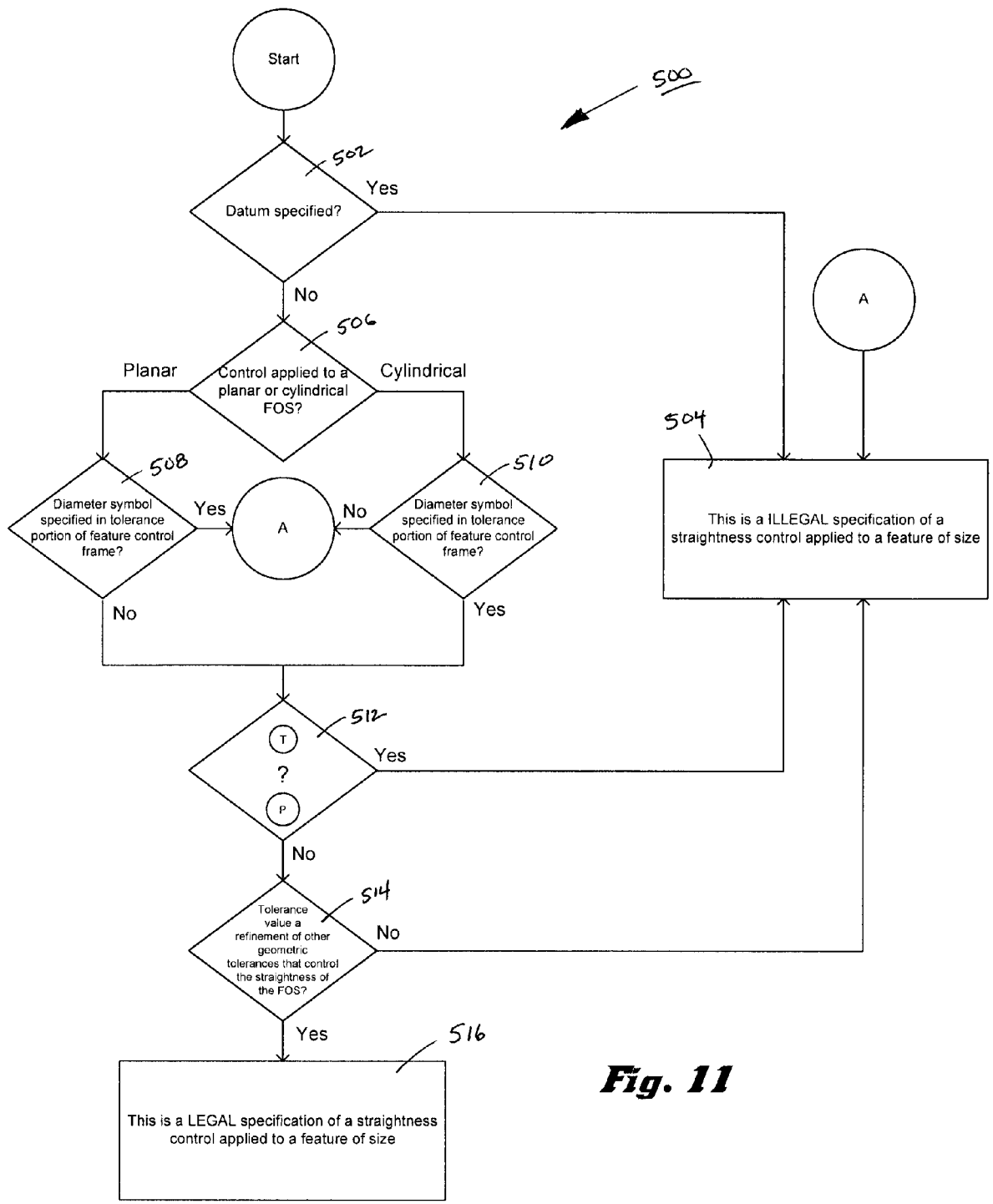
FIG. 11 illustrates another exemplary process that can be used to verify a straightness control of a FOS.

FIG. 11 illustrates an exemplary process 500 that determines whether a GD&T straightness control that is applied to an FOS is correctly applied in a CAD drawing. In some embodiments, the process 500 is carried out by the validation tool during step 94 of the process 80 (FIG. 2). The process 500 begins by determining if any datum references are specified (step 502). In some embodiments, no datum references are allowed when specifying a straightness control to an FOS. As such, if datum references are included in the straightness control frame, the specification of the straightness control of an FOS is identified as illegal (step 504) by the validation tool. If no datum references are included, the validation tool checks if the straightness control is applied to a planar or cylindrical FOS (step 506). If the straightness control is applied to a planar FOS, the validation tool verifies that a diameter symbol is not specified in the tolerance portion of the straightness control frame (step 508). If a diameter symbol is included in the tolerance portion of the control frame, the validation tool identifies an illegal specification of straightness control that is applied to an FOS (step 504). Alternatively, if the straightness control is applied to a cylindrical FOS, the validation tool verifies that a diameter symbol is included in the tolerance portion of the control frame (step 510). If the diameter symbol is not included, the validation tool identifies an illegal specification straightness control that is applied to a FOS (step 504).

After verifying that a diameter symbol is not included in the planar frame (step 508) and a diameter is included in the cylindrical frame (step 510), the validation tool verifies that projected and tangential tolerance symbols are not included in the control frame (step 512). If projected and tangential tolerance symbols are included, the validation tool identifies an illegal specification of a straightness control that is applied to an FOS (step 504). Finally, the validation tool verifies that the straightness tolerance value for the FOS is a refinement of another dimension tolerance (if included) that controls the straightness of the toleranced FOS (as previously described) (step 514). For example, in some embodiments, the straightness tolerance must be less than 70% of dimension tolerances including position, total runout, profile of surface, and cylindricity, if such dimension tolerances are applied to the controlled element. If a valid refinement is included, the validation tool identifies that the specification of straightness control for an FOS is legal (step 516).

Figure 12:
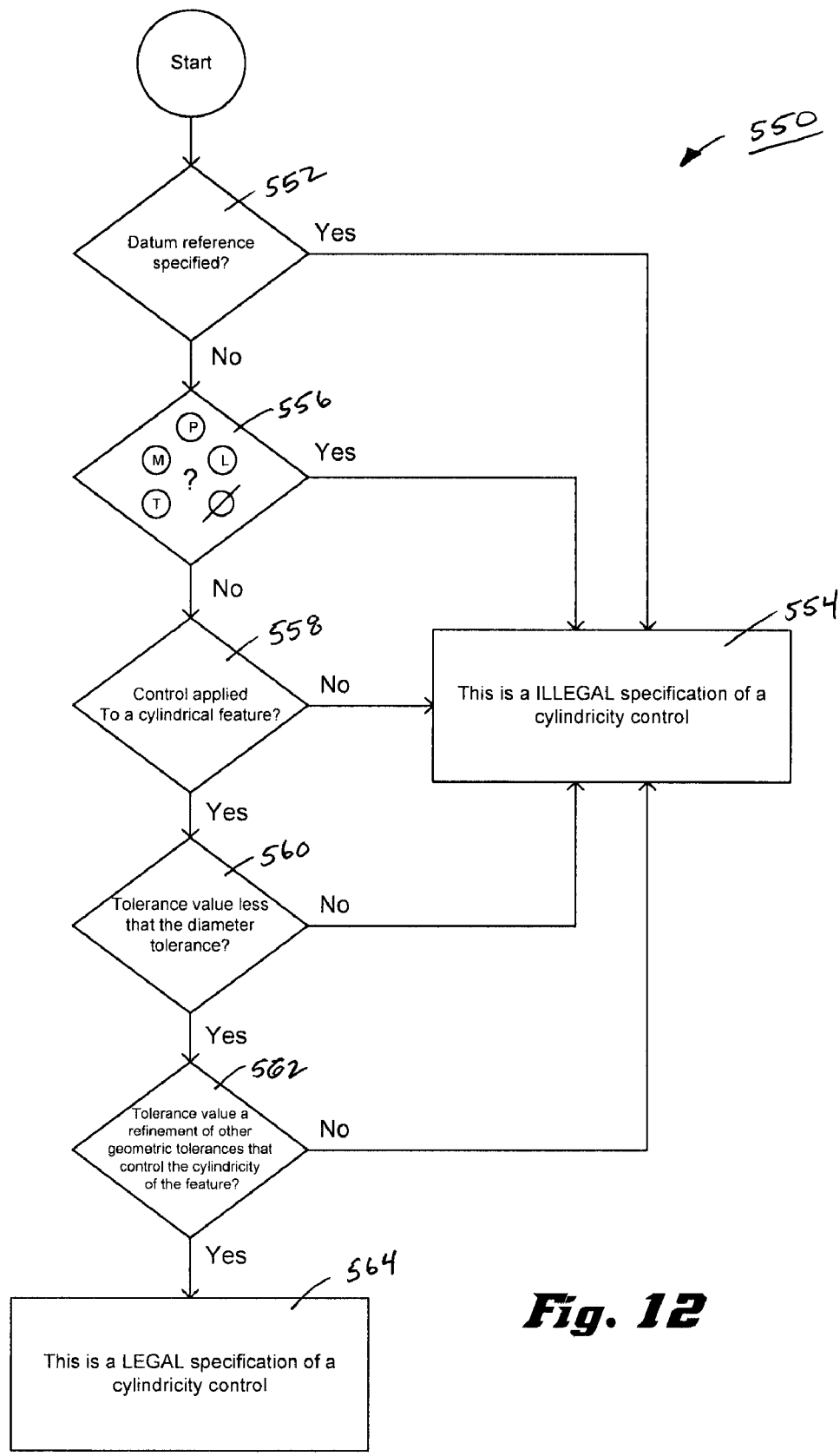
FIG. 12 illustrates an exemplary process that can be used to verify a cylindricity control.

FIG. 12 illustrates an exemplary process 550 that determines whether a GD&T cylindricity control is correctly applied in a CAD drawing. Similar to the process 500 (FIG. 11), the process 550 begins by determining if any datum references are specified (step 552), and if they are, the validation tool identifies an illegal specification of a cylindricity control (step 554). If no datum references are included, the validation tool verifies that illegal tolerance modifiers are not specified (step 556). In some embodiments, illegal tolerance modifiers include diameter, maximum material condition, least material condition, tangential, and projected modifiers. Next, the validation tool verifies that the control is applied to a cylindrical feature (step 558), and that the tolerance value of the cylindricity control is less than the diameter tolerance (step 560). If both of those steps (steps 558 and 560) are true, the validation tool verifies that the value of the cylindricity control is a refinement of another geometric tolerance (if included) (step 562). In some embodiments, the refinement must be less than 70% of total runout and profile of surface tolerances. If the cylindricity control is not applied to a cylindrical feature, the tolerance value of the cylindricity control is less than the diameter tolerance, or the refinement does not meet the refinement requirements, the validation tool identifies an illegal specification of a cylindricity control (step 554). If such conditions are met, the validation tool identifies that the specification of cylindricity control is legal (step 564).

Figure 13:
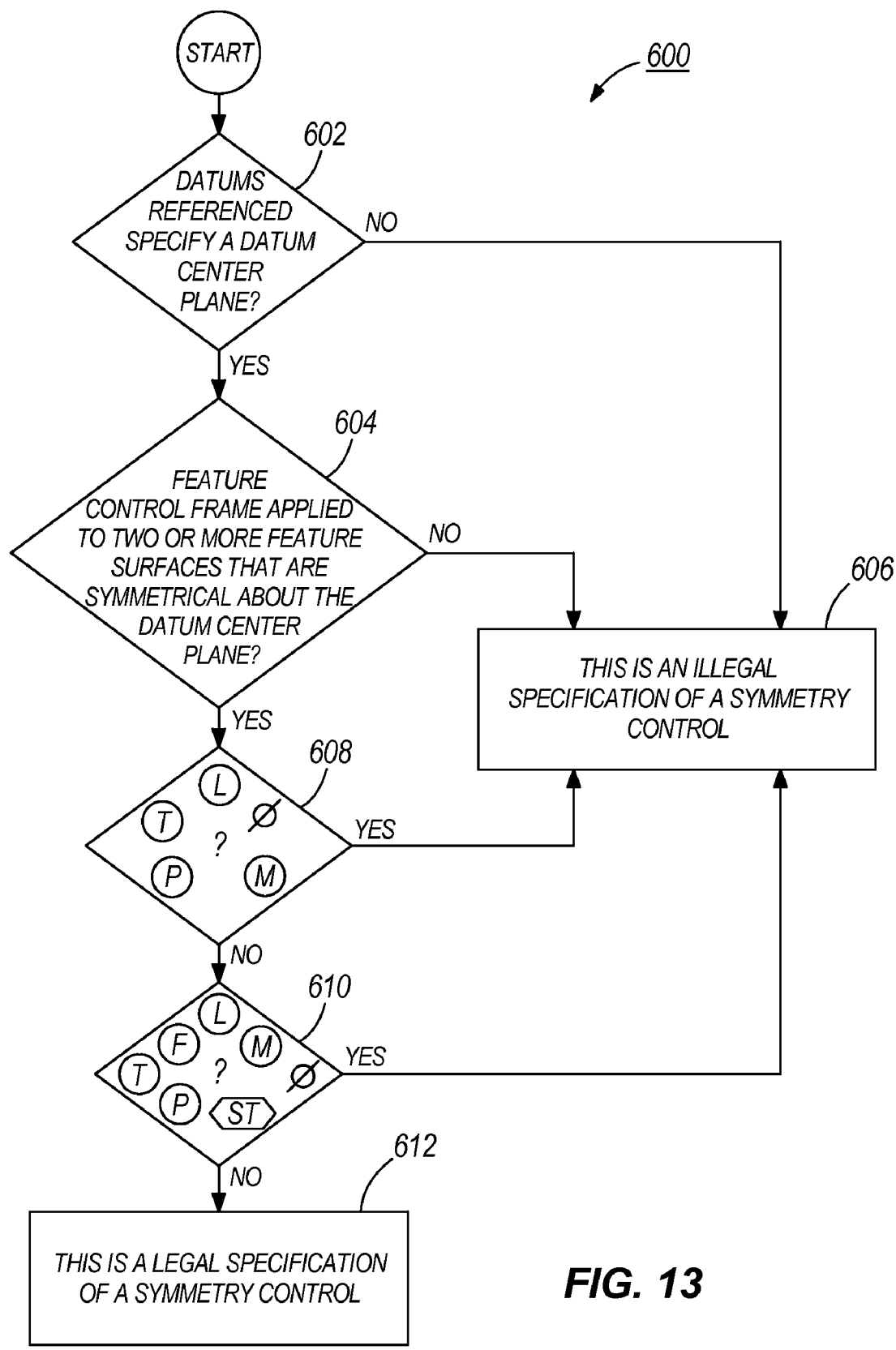
FIG. 13 illustrates an exemplary process that can be used to verify a symmetry control.

FIG. 13 illustrates an exemplary process 600 that determines whether a GD&T symmetry control is correctly applied in a CAD drawing. In some embodiments, the first step of the process 600 is verifying that the referenced datum specify a datum center plane (step 602). For example, the validation tool verifies that the datum are attached to an FOS and are also inline with a dimension line (i.e., the datum are not offset). The next step is verifying that the feature control frame is applied to two or more surfaces that are symmetrical about the datum center plane (step 604). If either step 602 or step 604 is not true, the validation tool identifies an illegal specification of a symmetry control (step 606). The next steps in the process 600 include verifying that illegal tolerance modifiers and datum modifiers are not included in the control frame (steps 608 and 610, respectively). In some embodiments, only free state and statistical tolerance modifiers are allowed, and no datum modifiers are allowed. If illegal modifiers are used, the validation tool indicates an illegal specification of a symmetry control (step 606). If only the allowed tolerance modifiers are included, and no datum modifiers are included, the validation tool identifies a legal specification of symmetry control (step 612).

Figure 14:
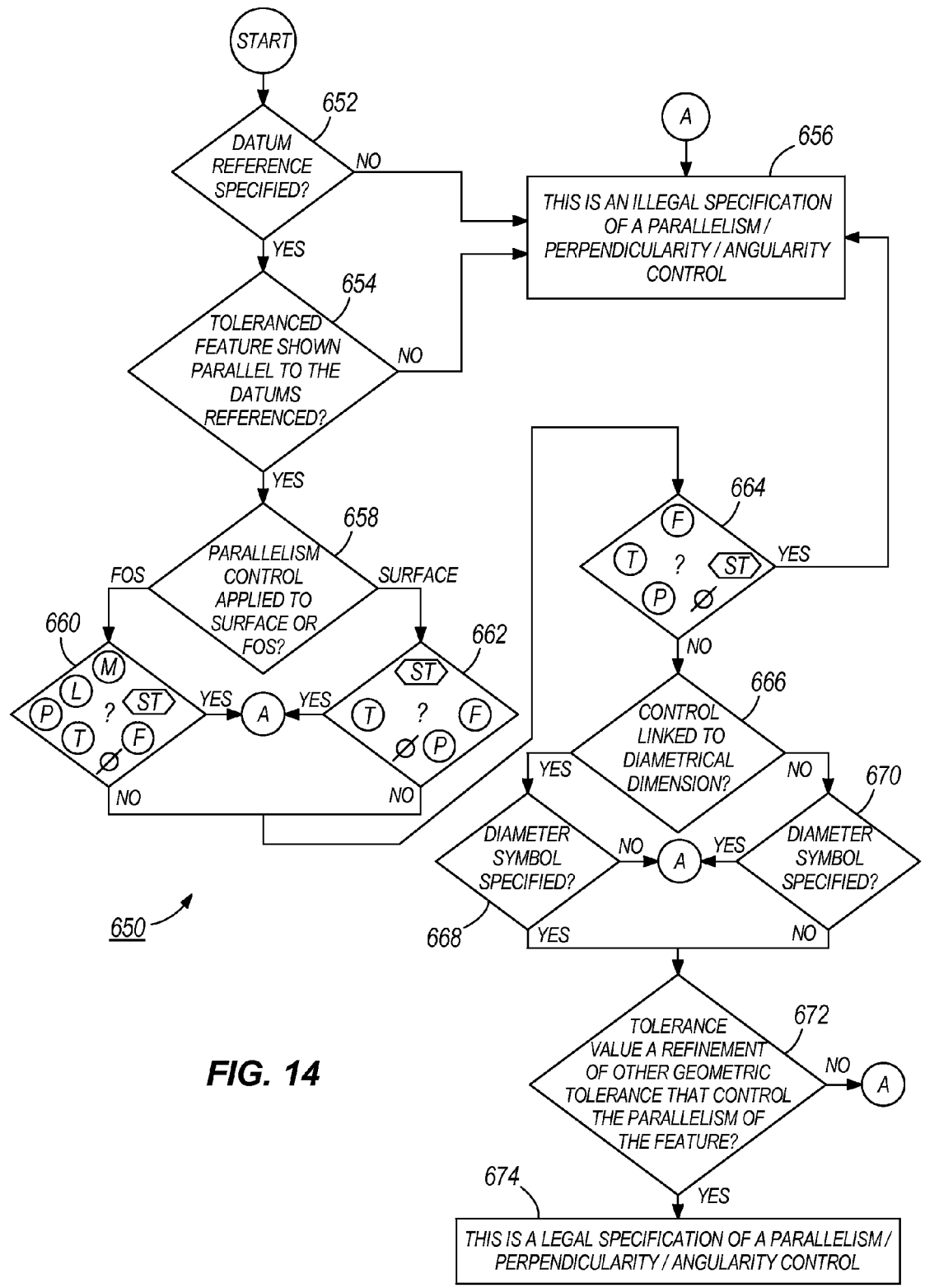
FIG. 14 illustrates an exemplary process that can be used to verify a parallelism control.

FIG. 14 illustrates a process 650 that determines whether a GD&T parallelism control is correctly applied in a CAD drawing. In some embodiments, the process 650 can also be used to determine whether a perpendicularity control symbol and an angularity control symbol are correctly applied. However, in the interest of brevity, the process 650 will only be described with respect to a parallelism control symbol. One of ordinary skill in the art should realize that the rules described with respect to validating a parallelism control symbol can be similarly applied to perpendicularity and angularity control symbols.

The process 650 begins by verifying that at least one datum reference is specified (step 652), and that the parallelism control is applied to an element that is parallel to the datum(s) referenced (step 654). If the conditions set forth in the first two steps (step 652 and step 654) of the process 650 are not true, an illegal specification of a parallelism control is identified (step 656). Next, the validation tool checks if the parallelism control is applied to a surface or an FOS (step 658). If the parallelism control is applied to an FOS, the validation tool checks for illegal tolerance modifiers such as the tangential modifier (step 660). Alternatively, if the parallelism control is applied to a feature (e.g., a surface), the validation tool checks for illegal tolerance modifiers including maximum material condition, least material condition, tangential, diameter, and projected tolerance (step 662). If any of the illegal tolerance modifiers are specified, the validation tool identifies an illegal specification of parallelism control (step 656). The validation tool then checks for illegal datum modifiers (step 664). In some embodiments, illegal datum modifiers include free state, statistical tolerance, tangential, projected tolerance, and diameter modifiers. If illegal datum modifiers are included, the validation tool identifies an illegal specification of a parallelism control (step 656).

Next, the validation tool checks if the parallelism control is linked to a diametrical dimension (step 666). If there is a link to a diametrical dimension, the validation tool verifies that a diameter symbol is included in the control frame (step 668). If the parallelism control is not linked to a diametrical dimension, the validation tool verifies that a diameter symbol is not included in the control frame (step 670). If the diameter symbol is correctly applied, the validation tool verifies that the parallelism control is a refinement of other dimensional tolerances that control the parallelism of the specified element (step 672) (as previously described). In some embodiments, the parallelism control value must be a refinement of geometric tolerances including diameter, total runout, and profile of surface tolerances, if such tolerances are specified. If the tolerance value satisfies the refinement rule set forth in step 672, the validation tool identifies a legal specification of parallelism control (step 674). As described above, the process 650 can be similarly applied to perpendicularity and angularity control symbols. As such, the tolerance values for such control symbols must be a refinement of a flatness tolerance, if a flatness tolerance is applied to the controlled element.

In some embodiments, each of the steps of the processes shown in FIGS. 4-14 are carried out by the validation tool upon initialization, regardless of the outcome of the steps. For example, in the process 150 shown in FIG. 4, steps 170, 172, 174, 176, 178, and 180 are all completed regardless of whether the evaluation of any of the steps leads to step 158 (i.e. the specification of profile control is illegal). As a result, multiple errors in the drawing can be discovered with a single iteration of the processes.

In addition to validating GD&T, the validation tool can validate other elements of the drawing. For example, the validation tool identifies entities that are not attached to or incorporated with the component in the drawing (e.g., "floating" or "fake" components that are not associated with other components in the drawing). Such components may be added to the drawing in another view (e.g., expand view), but are not tied to other drawing views and cannot be related to other drawing components. Additionally, the validation tool identifies illegally specified datum. For example, if a datum feature is included in a control frame, the validation tool verifies that the datum feature is specified in the drawing. Alternatively, if a datum feature is included in the drawing, the validation tool verifies that the datum feature is included in at least one feature control frame. The validation tool can also verify that datums are correctly aligned with dimension lines. For example, if a datum is applied to a feature of size, the validation tool verifies that the datum is inline with the corresponding dimension line. Alternatively, if a datum is applied to a feature, the validation tool verifies that the datum is offset from the corresponding dimension line. Additionally, the validation tool can verify the presence of a drawing title block, and whether the title block conforms to certain title block standards (e.g., ASME title block standards). The validation tool can also verify that GD&T symbols that are included in the drawing are attached to a feature, an FOS, a feature extension line, or a dimension line (i.e., the GD&T symbols are not "floating" in the drawing).

Figure 15:
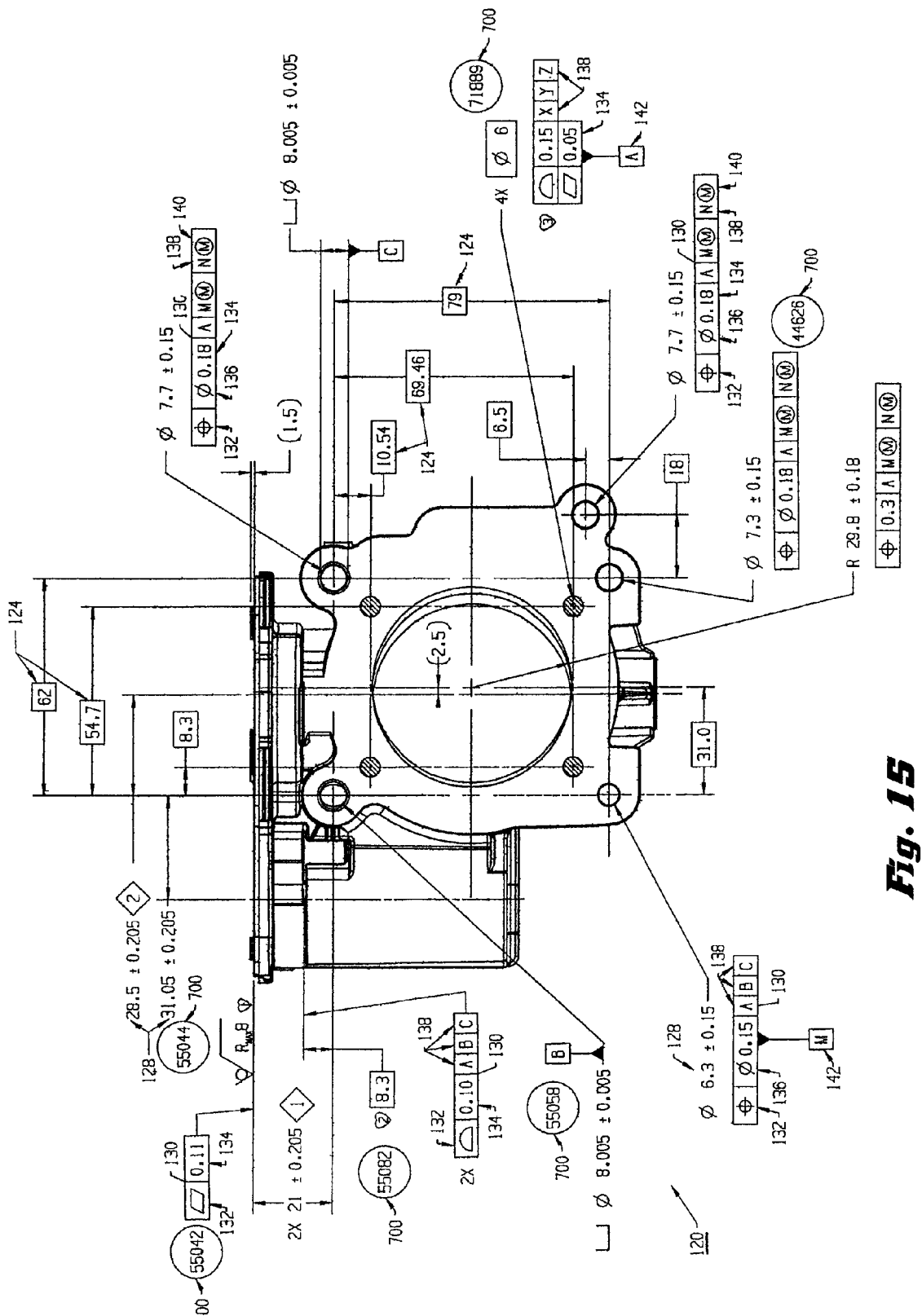
FIG. 15 illustrates an exemplary CAD drawing having an illegal symbol indicator.

FIG. 15 illustrates an embodiment of the drawing 120 (see FIG. 3) that includes illegal GD&T indicators 700. In some embodiments, the illegal indicators 700 include an error number that is enclosed by a circle. In other embodiments, the illegal indicators 700 may be displayed differently (e.g., an error number enclosed by a different shape, a colored error number, an alternative indicator symbol, etc.). The illegal indicators 700 notify a user that GD&T symbols, dimensions, and/or datum have been illegally applied in the drawing 120 (step 96 of the process 80 shown in FIG. 2). The illegal indicators 700 are added to the drawing 120 after the validation tool is run. As such, each illegal indicator 700 refers to a step or condition in one of the processes (see FIGS. 4-14) that was not satisfied.

In some embodiments, the illegal indicators 700 are interactive such that a user can select the illegal indicator 700 using a user input device (see FIG. 1) while the drawing 120 is displayed on the screen 24. Selecting the illegal indicator 700 initializes an informational "window" to appear, which can provide the reason that the symbol was identified as being illegally applied. Additionally or alternatively, descriptive information regarding each identified illegal symbol can be included in a separate report (described below), as well as a help or user manual (also described below). In some embodiments, the user can remove the illegal indicators 700 from the drawing 120 after the illegal indicators 700 have been inspected. For example, the user may print a hard-copy of the drawing 120 with the illegal indicators 700 after the validation tool is run, and then return the drawing 120 to its prior state (without the illegal indicators 700 being displayed) with a single actuation of one of the user input devices (see FIG. 1).

FIG. 16 illustrates an exemplary report 750. In some embodiments, the report 750 is created (e.g., in step 100 of the process 80 shown in FIG. 2) by the validation tool after the validation tool has identified the illegal GD&T in the drawing 120. As such, the report 750 can be linked to the drawing 120 such that each illegal indicator 700 included in the drawing 120 corresponds to a portion of the report 750 (described below). The report 750 generally includes a drawing information portion 754 and an illegal indicator information portion 758. The drawing information portion 754 recites information about the drawing including the file name, the number of GD&T applications (e.g., the application of GD&T rules or controls) that were identified by the validation tool, the number of datum symbols that were identified by the validation tool, and the total number of errors or illegal GD&T applications that were identified by the validation tool. However, the drawing information portion 754 may include more or less information than that shown in FIG. 16. For example, in an alternative embodiment, the drawing information portion 754 also includes information regarding the date of drawing creation, the drawing revision, etc.

The illegal indicator information portion 758 provides information about each illegal GD&T application. In some embodiments, the information is grouped by illegal indicator (e.g., the error code of the illegal indicator) 768. Descriptive fields can be listed below each error code 768 to provide a full description of the illegally applied GD&T application. For example, in the embodiment shown in FIG. 16, the fields include type of error 770, drawing sheet name 772, drawing view name 774, location name 776, symbol identification ("ID") number 778, and specification 780. Additionally, in some embodiments, a user manual section field 782 is also included (as described below).

The type of error field 770 indicates the type of error that was identified by the validation tool. For example, in the embodiment shown in FIG. 16, the type of error field 770 indicates that a GD&T profile of surface control has been used incorrectly. The drawing sheet name field 772 provides the assigned name of the drawing (e.g., a name applied to the drawing when the drawing was saved). If the drawing has not been assigned a name by a user, the drawing sheet name field 772 may be blank. Alternatively, if unnamed, the drawing sheet may be assigned a default name when the validation tool is run, causing the drawing sheet name field 772 to include the default name. In some embodiments, drawings can include more than one drawing view for the same modeled component (described above). As such, the drawing view name field 774 includes the name of the drawing view in which the illegal GD&T application has been identified on. The location name field 776 provides information regarding the on-screen or on-drawing location of the illegal GD&T application. In the embodiment shown in FIG. 16, the location is described with words (e.g., mid-bottom, left-top, etc.). However, the location can be described differently, for example, using a grid system.

The symbol ID number field 778 provides error code information that corresponds to each indication of illegal GD&T applications. For example, in some embodiments, each step of the processes (see FIGS. 4-14) is assigned an error number. If the validation tool identifies an error while completing a step of the processes, the validation tool associates the error number assigned to that step with the identified error. As such, the error number provides a user with the precise step in the validation tool processes that was identified by the validation tool as being illegal. Additionally, the specification field 780 provides a short description of the error code. For example, if the error code associated with step 154 of the process 150 is flagged, the specification field indicates that the type of profile (e.g., planar, coplanar, true profile) was not known.

Figure 17:
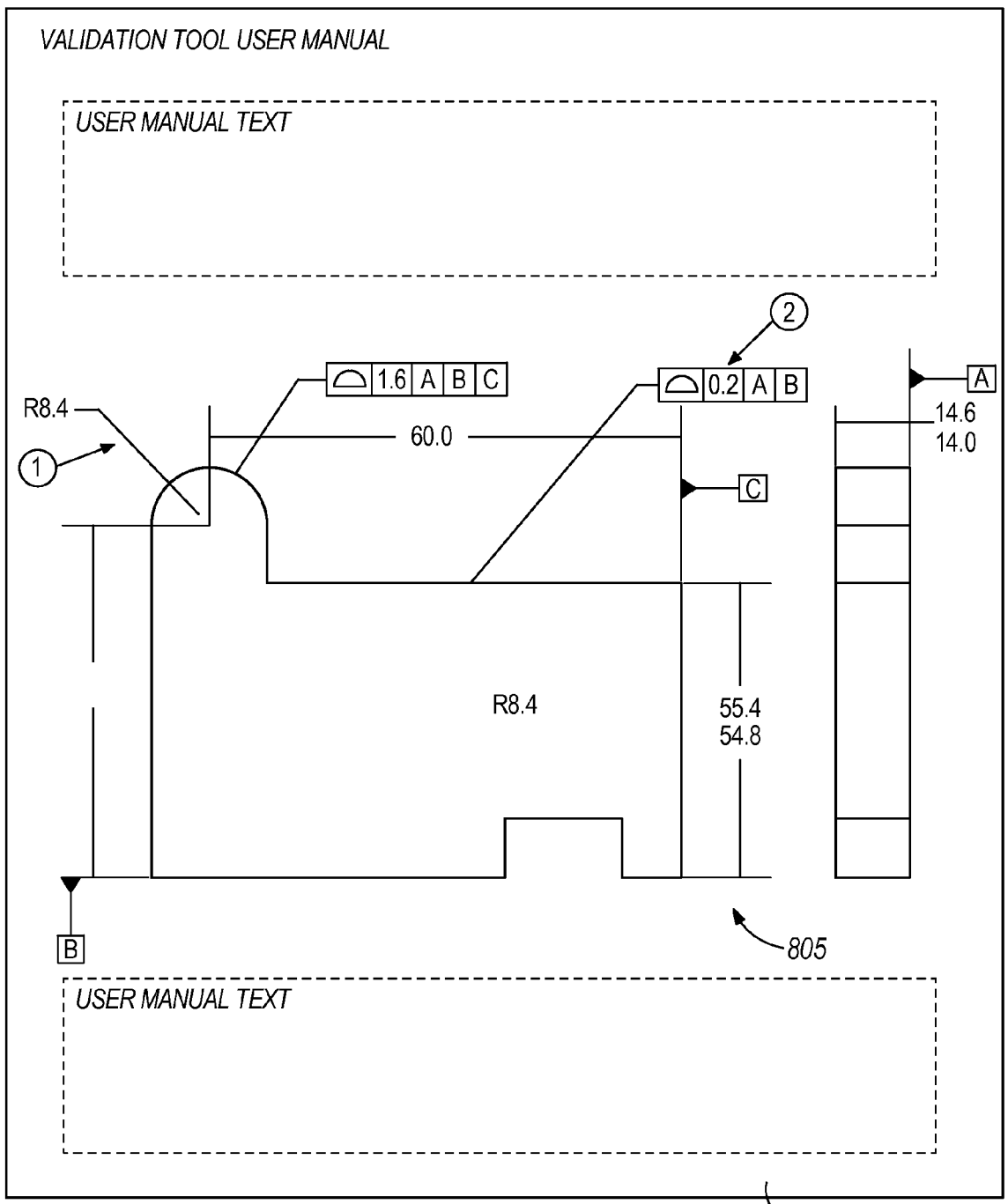
FIG. 17 illustrates an exemplary portion of a help or user manual.

As noted, in some embodiments, a user or help manual is included with the validation tool, which provides detailed information about each step of the processes. In such embodiments, the user manual section field 782 indicates a section of a user manual that corresponds to the identified error. An exemplary portion of a user manual 800 is shown in FIG. 17. A user can reference the user manual 800 to obtain more details about each error, as well as possible correction instructions or procedures to remedy the error. For example, in the embodiment shown in FIG. 16, the user manual section field 782 indicates that section 01-1C provides information about the GD&T profile of surface control. The user manual 800 provides a relatively simplified example 805, as well as information regarding the improper GD&T application. In some embodiments, the user manual 800 is electronic, and is initialized by selecting one of the error indicators 700, as described with respect to FIG. 15. In other embodiments, the user manual 800 is a hard-copy manual.

Referring again to FIG. 16, the validation tool report 750 can also provide other details about the drawing 120. For example, in the embodiment shown in FIG. 16, the validation tool report 750 includes a symbol information section 784 which lists the total number of times each type of GD&T is used and how many times the type of GD&T was identified as being illegal. Additionally, the validation tool report 750 includes a datum information section 786, which provides information about illegally applied datum. For example, the datum information section 786 includes information regarding datum features that were applied in the drawing but not called out in any feature control frames. Alternatively, the datum information section 786 can also include information about datum features that were included in feature control frames, but not called out in the drawing. In other embodiments, the validation tool report 750 can include more or less information than shown in FIG. 16. For example, in an alternative embodiment, an abbreviated report can be created that lists only error code and location information.

Thus, at least in one embodiment, a software validation tool is used to validate a CAD drawing that includes one or more dimensioning and tolerancing symbols, modifiers, and/or feature control frames. The software validation tool can also be used to verify the manner in which the features are attached to the feature control frames. Additionally, the GD&T magnitude and shape are verified for correctness along with the relationship between features/features of size that are linked by the GD&T feature control frame. The GD&T feature control frame, symbols, and modifiers are a dimensioning tool that controls the shape, size, location, and orientation of the feature/feature of size and links the features/features of size to other features/features of size and to datums. The software validation tool helps ensure that all the GD&T dimensioning tools define all these functions and relationships correctly. The rules that are imbedded in the validation tool software determine if the GD&T dimensioning tool is being correctly defined on the CAD drawing and creates a report on each rule that is illegal or questionable. The error is numbered on the CAD drawing and the number is used in the report to help the operator locate the error on the drawing. The report describes why it is illegal and provides the location in the user manual where an example of the error is shown along with examples on how to correct the error (e.g., see FIG. 17). Various embodiments of the invention are set forth in the following claims.

The invention claimed is:

1. A computer-implemented method of validating an application of geometric dimensioning and tolerancing ("GD&T") in a drawing by using a drawing validation tool, the method comprising:

operating a processor for executing software instructions stored in a computer readable memory, the software instructions defining a plurality of modules;

validating, by the processor with a process module, a specification of geometric dimensioning and tolerancing with a set of geometric dimensioning and tolerancing rules;

identifying, by the processor with an identification module, illegal specification of geometric dimensioning and tolerancing, wherein the illegal specification includes geometric dimensioning and tolerancing that does not satisfy the set of rules;

producing, by the processor with a report module, a report that contains information regarding the illegal specification of geometric dimensioning and tolerancing; and providing, by the processor with an electronic user manual module, a correction instruction regarding the illegal specification of geometric dimension and tolerancing, the correction instruction referenced in the report.

2. The method of claim 1, further comprising validating, by the processor with the process module, the specification of at least one of a profile control, a TOP control, a flatness control, a runout callout, a concentricity control, a circularity control, a straightness control, a cylindricity control, a symmetry control, a parallelism control, a perpendicularity control, and an angularity control.

3. The method of claim 1, further comprising comparing, by the processor with a datum module, a datum in a drawing to a datum included in a feature control frame of the drawing.

4. The method of claim 1, further comprising evaluating, by the processor with a modifier module, at least one of a datum modifier and a tolerance modifier associated with the specification of the geometric dimensioning and tolerancing rules.

5. The method of claim 4, further comprising verifying, by the processor with a refinement module, that the at least one datum modifier and tolerance modifier have refinement tolerances less than 70 percent of another geometric tolerance.

6. A computer-implemented method of validating an application of geometric dimensioning and tolerancing ("GD&T") in a drawing by using a drawing validation tool, the method comprising:

providing an image produced on a display device;

operating a processor for executing software instructions stored in a computer readable memory, the software instructions defining a plurality of modules;

validating, by the processor with a process module, a specification of geometric dimensioning and tolerancing with a set of geometric dimensioning and tolerancing rules;

identifying, by the processor with an identification module, an illegal specification of geometric dimensioning and tolerancing, wherein the illegal specification includes geometric dimensioning and tolerancing that does not satisfy the set of rules;

producing, by the processor with a report module, a report that contains information regarding the illegal specification of geometric dimensioning and tolerancing; and providing, by the processor with an electronic user manual module, correction instructions regarding the illegal specification of geometric dimension and tolerancing, the correction instructions referenced in the report.

7. The method of claim 6, further comprising validating, by the processor with the process module the specification of at least one of a profile control, a TOP control, a flatness control, a runout callout, a concentricity control, a circularity control, a straightness control, a cylindricity control, a symmetry control, a parallelism control, a perpendicularity control, and an angularity control.

8. The method of claim 6, further comprising comparing, by the processor with a datum module, a datum in a drawing to a datum included in a feature control frame of the drawing.

9. The method of claim 6, further comprising evaluating, by the processor with a modifier module, at least one of a datum modifier and a tolerance modifier associated with the specification of the geometric dimensioning and tolerancing rules.

10. The method of claim 9, further comprising verifying, by the processor with a refinement module, that the at least one datum modifier and tolerance modifier have refinement tolerances less than 70 percent of another geometric tolerance.

11. The drawing validation system of claim 6, wherein the correction instructions include one or more example drawings.

12. The drawing validation system of claim 6, further comprising automatically initializing the drawing validation tool.

* * * * *